(12) United States Patent
Sugaya

(10) Patent No.: US 12,309,249 B2
(45) Date of Patent: *May 20, 2025

(54) COMMUNICATION DEVICE AND COMMUNICATION METHOD

(71) Applicant: Sony Group Corporation, Tokyo (JP)

(72) Inventor: Shigeru Sugaya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,969

(22) Filed: Apr. 19, 2024

(65) Prior Publication Data

US 2024/0267441 A1 Aug. 8, 2024

Related U.S. Application Data

(63) Continuation of application No. 18/090,550, filed on Dec. 29, 2022, now Pat. No. 12,010,201, which is a continuation of application No. 17/109,167, filed on Dec. 2, 2020, now Pat. No. 11,563,831, which is a continuation of application No. 16/436,942, filed on Jun. 11, 2019, now Pat. No. 10,873,651, which is a continuation of application No. 15/745,268, filed as
(Continued)

(30) Foreign Application Priority Data

Sep. 9, 2015 (JP) .................................. 2015-177516

(51) Int. Cl.
*H04L 69/22* (2022.01)
*H04L 69/324* (2022.01)
*H04W 28/06* (2009.01)
*H04W 76/10* (2018.01)
*H04W 80/02* (2009.01)
*H04W 84/12* (2009.01)

(52) U.S. Cl.
CPC ............ *H04L 69/22* (2013.01); *H04L 69/324* (2013.01); *H04W 28/06* (2013.01); *H04W 76/10* (2018.02); *H04W 80/02* (2013.01); *H04W 84/12* (2013.01)

(58) Field of Classification Search
None
See application file for complete search history.

(56) References Cited

U.S. PATENT DOCUMENTS 7,596,101 B2 9/2009 Oguchi
9,363,175 B2 6/2016 Chu et al.
(Continued)

FOREIGN PATENT DOCUMENTS

JP 2013-527647 A 6/2013
JP 2014-520426 A 8/2014

OTHER PUBLICATIONS

International Search Report issued Sep. 27, 2016 in PCT/JP2016/070873 filed Jul. 14, 2016.
(Continued)

*Primary Examiner* — Otis L Thompson, Jr.
(74) *Attorney, Agent, or Firm* — XSENSUS LLP

(57) ABSTRACT

A communication device including: a communication unit configured to transmit a first frame including a second association identifier decided by a communication device to which a first association identifier is allocated and receive a second frame including information related to the second association identifier.

18 Claims, 22 Drawing Sheets

Related U.S. Application Data application No. PCT/JP2016/070873 on Jul. 14, 2016, now Pat. No. 10,362,150.

(56) References Cited

U.S. PATENT DOCUMENTS

| | | | |
|---|---|---|---|
| 9,807,797 B2 | 10/2017 | Cheong et al. | |
| 10,278,210 B2 | 4/2019 | Ahn et al. | |
| 10,362,150 B2 | 7/2019 | Sugaya | |
| 2003/0177267 A1 | 9/2003 | Orava et al. | |
| 2005/0135284 A1* | 6/2005 | Nanda | H04W 74/06 370/294 |
| 2006/0205349 A1 | 9/2006 | Passier et al. | |
| 2006/0294216 A1 | 12/2006 | Swanson et al. | |
| 2007/0271588 A1 | 11/2007 | Bunn et al. | |
| 2009/0310515 A1 | 12/2009 | Wang et al. | |
| 2010/0085905 A1 | 4/2010 | Matsue | |
| 2011/0058540 A1 | 3/2011 | Bunn et al. | |
| 2011/0317630 A1 | 12/2011 | Zhu et al. | |
| 2012/0044925 A1* | 2/2012 | Lee | H04L 27/2602 370/338 |
| 2012/0051312 A1* | 3/2012 | Noh | H04W 4/00 370/329 |
| 2012/0140753 A1 | 6/2012 | Lee et al. | |
| 2012/0176921 A1 | 7/2012 | Abraham et al. | |
| 2012/0230247 A1 | 9/2012 | Kwon et al. | |
| 2012/0263084 A1 | 10/2012 | Liu et al. | |
| 2012/0284407 A1 | 11/2012 | Yan et al. | |
| 2013/0128831 A1* | 5/2013 | Calcev | H04L 69/04 370/329 |
| 2013/0229969 A1 | 9/2013 | Quan et al. | |
| 2013/0301605 A1* | 11/2013 | Kim | H04L 1/00 370/330 |
| 2013/0329620 A1 | 12/2013 | Kim et al. | |
| 2014/0029600 A1 | 1/2014 | Kim et al. | |
| 2014/0112230 A1 | 4/2014 | Sammour et al. | |
| 2014/0146809 A1 | 5/2014 | Xing et al. | |
| 2014/0207809 A1 | 7/2014 | Zhang et al. | |
| 2014/0314054 A1 | 10/2014 | Seok et al. | |
| 2014/0334387 A1* | 11/2014 | Doppler | H04W 74/0816 370/329 |
| 2014/0369301 A1 | 12/2014 | Wu et al. | |
| 2015/0029977 A1 | 1/2015 | Seok | |
| 2015/0208439 A1 | 7/2015 | Cheong et al. | |
| 2015/0245377 A1 | 8/2015 | Lee et al. | |
| 2016/0014813 A1 | 1/2016 | Seok | |
| 2016/0316362 A1 | 10/2016 | Ding | |
| 2016/0330722 A1 | 11/2016 | Pantelidou et al. | |
| 2016/0374009 A1 | 12/2016 | Hiertz et al. | |
| 2017/0006596 A1 | 1/2017 | Adachi et al. | |
| 2017/0006609 A1 | 1/2017 | Adachi et al. | |
| 2017/0026151 A1 | 1/2017 | Adachi | |
| 2017/0325262 A1 | 11/2017 | Tomeba et al. | |
| 2017/0373736 A1 | 12/2017 | Fang | |
| 2018/0049240 A1 | 2/2018 | Kim et al. | |
| 2018/0063884 A1 | 3/2018 | Park et al. | |
| 2018/0077735 A1 | 3/2018 | Ahn et al. | |
| 2018/0110076 A1 | 4/2018 | Ko et al. | |
| 2018/0124858 A1 | 5/2018 | Gan et al. | |
| 2018/0213516 A1 | 7/2018 | Kim et al. | |
| 2018/0288743 A1 | 10/2018 | Choi et al. | |
| 2019/0021025 A1 | 1/2019 | Ahn et al. | |
| 2020/0015041 A1 | 1/2020 | Cariou et al. | |

OTHER PUBLICATIONS

Faccinn et al., "TGu Proposal for Protection Cluster", Wireless LANs, IEEE P802.11, IEEE 802.11-06/0287r0, Mar. 6, 2006, pp. 1-8.

* cited by examiner

FIG. 4

| AID VALUE | USE |
|---|---|
| 0x0000 | UNUSED |
| 0x0001~0x07D7 | AID OF IEEE 802.11 STANDARD |
| 0x07D8~0x07FF | Reserved |
| 0x0800~0x08FF | TENTATIVE AID |
| 0x0900~0xFFFE | Reserved |
| 0xFFFF | UNUSED |

FIG. 8

| Category | VHT Action | VHT MIMO Control | VHT Compressed Beamforming Report | MU Exclusive Beamforming Report |

COMMUNICATION DEVICE AND COMMUNICATION METHOD

CROSS-REFERENCE TO RELATED APPLICATIONS

This application is a continuation of U.S. application Ser. No. 18/090,550, filed Dec. 29, 2022, which is a continuation of U.S. application Ser. No. 17/109,167, filed Dec. 2, 2020 (now U.S. Pat. No. 11,563,831), which is a continuation of U.S. application Ser. No. 16/436,942, filed Jun. 11, 2019 (now U.S. Pat. No. 10,873,651), which is a continuation of U.S. application Ser. No. 15/745,268, filed Jan. 16, 2018 (now U.S. Pat. No. 10,362,150), which is based on PCT filing PCT/JP2016/070873, filed Jul. 14, 2016, and claims priority to JP 2015-177516, filed Sep. 9, 2015, the entire contents of each are incorporated herein by reference.

TECHNICAL FIELD

The present disclosure relates to a communication device and a communication method.

BACKGROUND ART

In recent years, wireless local area networks (LANs) typified by Institute of Electrical and Electronics Engineers (IEEE) 802.11 have spread. In addition, with the wireless LANs, products corresponding to the wireless LANs (hereinafter also referred to as wireless communication devices) have also increased. When wireless communication devices increase, there is a high possibility of communication efficiency deteriorating. Therefore, it is desirable to improve the communication efficiency.

Thus, Patent Literature 1 discloses the invention related to a method of improving communication efficiency by reducing header information of a frame (packet). Specifically, instead of a global identifier such as a media access control (MAC) address, a local identifier such as an association identifier (AID) is stored as a part of the header information. Since the AID is data shorter than the MAC address, the size of the header information is contracted, thereby improving communication efficiency.

CITATION LIST

Patent Literature

Patent Literature 1: JP 2014-520426T

DISCLOSURE OF INVENTION

Technical Problem

In the invention disclosed in Patent Literature 1, however, it is difficult to improve communication efficiency in communication before allocation of an AID. For example, in a communication device in which an AID is not allocated, it is difficult to execute the above-described communication in which an AID is used as a part of the header information of a frame instead of a MAC address.

Accordingly, the present disclosure proposes a mechanism capable of improving communication efficiency even in communication before allocation of an AID.

Solution to Problem

According to the present disclosure, there is provided a communication device including: a communication unit configured to transmit a first frame including a second association identifier decided by a communication device to which a first association identifier is allocated and receive a second frame including information related to the second association identifier.

In addition, according to the present disclosure, there is provided a communication device including: a communication unit configured to receive a first frame including a second association identifier generated by a communication device to which a first association identifier is allocated and transmit a second frame including information related to the second association identifier.

In addition, according to the present disclosure, there is provided a communication method including: by a communication unit, transmitting a first frame including a second association identifier decided by a communication device to which a first association identifier is allocated; and receiving a second frame including information related to the second association identifier.

In addition, according to the present disclosure, there is provided a communication method including: by a communication unit, receiving a first frame including a second association identifier generated by a communication device to which a first association identifier is allocated; and transmitting a second frame including information related to the second association identifier.

Advantageous Effects of Invention

According to the present disclosure, as described above, it is possible to provide a mechanism capable of improving communication efficiency even in communication before allocation of an AID. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram illustrating an example of a setting range of a tentative AID according to the embodiment.

FIG. 8 is a diagram illustrating a configuration example of a VHT compressed beamforming (VCB) frame.

MODE(S) FOR CARRYING OUT THE INVENTION

Figure 1:
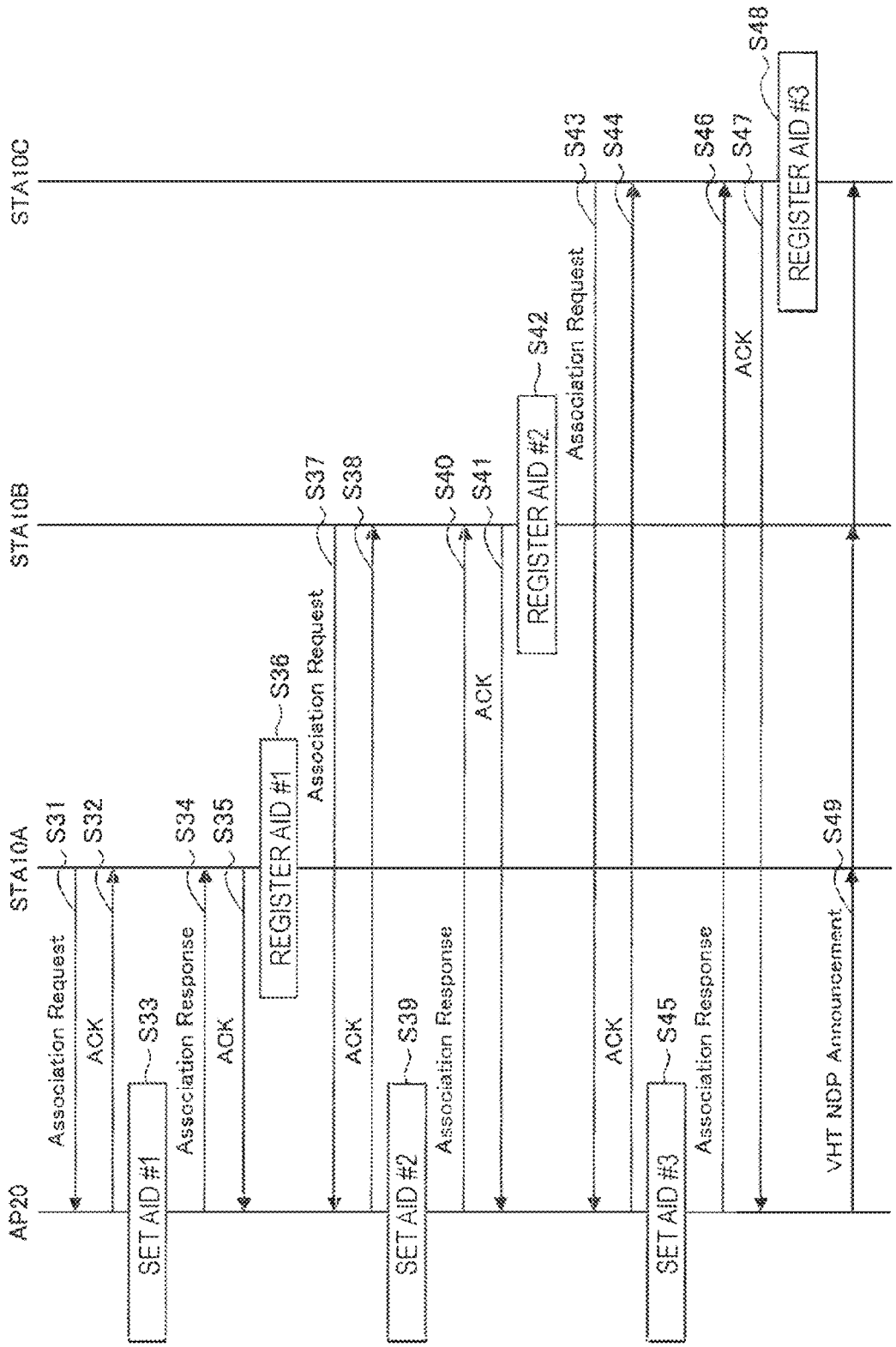
FIG. 1 is a sequence diagram conceptually illustrating an example of an association process of the related art.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are also cases in which a plurality of components having substantially the same function and structure are distinguished by adding different numbers to the end of the same reference numeral. For example, a plurality of components having substantially the same function are distinguished as necessary like an STA 10A and an STA 10B. However, in a case where it is unnecessary to distinguish components having substantially the same function and structure, only the same reference numeral is added. For example, in a case where it is unnecessary to particularly distinguish the STA 10A and the STA 10B, they are referred to as simply as an "STA 100."

Moreover, the description will be made in the following order.

1. Problem of technology of related art
2. First embodiment (sounding process using tentative AID)
   2-1. Configuration of communication system
   2-2. Configuration of communication device
   2-3. Functional details of communication device
   2-4. Process of communication device
   2-5. Conclusion of first embodiment
3. Second embodiment (association process using tentative AID)
   3-1. Functional details of communication device
   3-2. Process of communication device
   3-3. Conclusion of second embodiment
4. Application examples
5. Conclusion

1. Problem of Technology of Related Art

First, a problem of a technology of the related art will be described.

Communication devices of the related art have a wireless LAN communication function to transmit and receive frames. In addition, the communication devices of the related art include communication devices operating as stations (STAs) (hereinafter also referred to as STAs 10) and a communication device operating as an access point (AP) (hereinafter also referred to as an AP 20). Moreover, communication from the STA 10 to the AP 20 is also referred to as an uplink (UL) and communication from the AP 20 to the STA 10 is also referred to as a downlink (DL).

A frame transmitted or received by a wireless communication device of the related art generally includes a header including destination information of the frame and a data portion including data to be delivered. In the related art, as described above, a technology for achieving an improvement in communication efficiency by reducing the size of the header has been proposed. Specifically, a technology in which an AID is used as destination information included in the header instead of a MAC address has been proposed.

In addition, other technologies for achieving an improvement in communication efficiency using an AID have been proposed. For example, in the IEEE 802.11ac standard, a very high throughput (VHT) physical layer convergence protocol (PLCP) protocol data unit (PPDU) including an identifier generated from a part of the AID is defined. A frame with the VHT PPDU format is transmitted from the AP 20 to the STA 10. The STA can determine whether the frame with the VHT PPDU format is destined for the self-device at a stage at which the header of the received frame with the VHT PPDU format is decoded. Accordingly, it is possible to accelerate a communication process and improve a communication throughput because of a reduction in a communication amount.

Here, the AID can be allocated to a communication device through an association process. Specifically, the AP 20 receiving an association request from the STA 10 allocates the AID to the STA 10 by setting the AID in the STA 10 and notifying the STA 10 of the set AID. Further, an association process of the related art will be described in detail with reference to FIG. 1. FIG. 1 is a sequence diagram conceptually illustrating an example of the association process of the related art.

First, an STA 10A transmits an association request frame to the AP 20 when a connection request with the AP 20 occurs (step S31).

The AP 20 receiving the association request frame transmits an acknowledgment (ACK) (confirmation response) to the association request frame (step S32) and sets AID #1 (step S33). Specifically, the AP 20 decides an AID in the STA 10A which is a transmission source of the association request frame without overlapping in a setting range of the AID prepared in advance.

Subsequently, the AP 20 transmits an association response frame including the set AID to the STA 10A (step S34).

The STA 10A receiving the association response frame transmits a confirmation response frame for the association response frame (step S35) and registers the allocated AID #1 (step S36).

In this way, the AID can be allocated to the STA 10 through the association process executed between the STA 10 and the AP 20. Accordingly, unless the association process is executed later, it is difficult to execute communication using the above-described AID.

Moreover, the association process is individually executed for each STA 10. For example, as illustrated in FIG. 1, an association process of the STA 10B (steps S37 to S42) and an association process of the STA 10C (steps S43 to S48) are executed in sequence after the association process of the STA 10A ends.

Then, after the association processes with all the STAs 10 end, that is, the allocation of the AIDs ends, communication in which the AIDs are used can be executed. For example, in a case in which the communication with each STA 10 is executed after the end of the association processes of the STAs 10A to 10C, a VHT null data packet (NDP) announcement frame illustrated in FIG. 1 is transmitted as a part of communication executed to collect channel information of the STAs 10A to 10C to be described below.

In this way, in a case in which association requests to the plurality of STAs occur, the association process is executed for each STA 10. Therefore, to execute the association process, the STA 10 is caused to wait. Thus, an overhead for the association process increases and communication efficiency deteriorates.

Accordingly, the present disclosure proposes a mechanism capable of improving communication efficiency even in communication before an AID is allocated. Hereinafter, the details of the mechanism will be described. Moreover, to facilitate the description, communication devices according to first and second embodiments are distinguished from each other by suffixing numbers corresponding to the embodiments, as in communication devices 100-1 and 100-2.

2. First Embodiment (Sounding Process Using Tentative AID)

The problem of the technology of the related art has been described above. Next, a communication system according to the first embodiment of the present disclosure will be described. The communication system according to the embodiment executes a sounding process of a channel in which a tentative AID to be described below is used.

<2-1. Configuration of Communication System>

Figure 2:
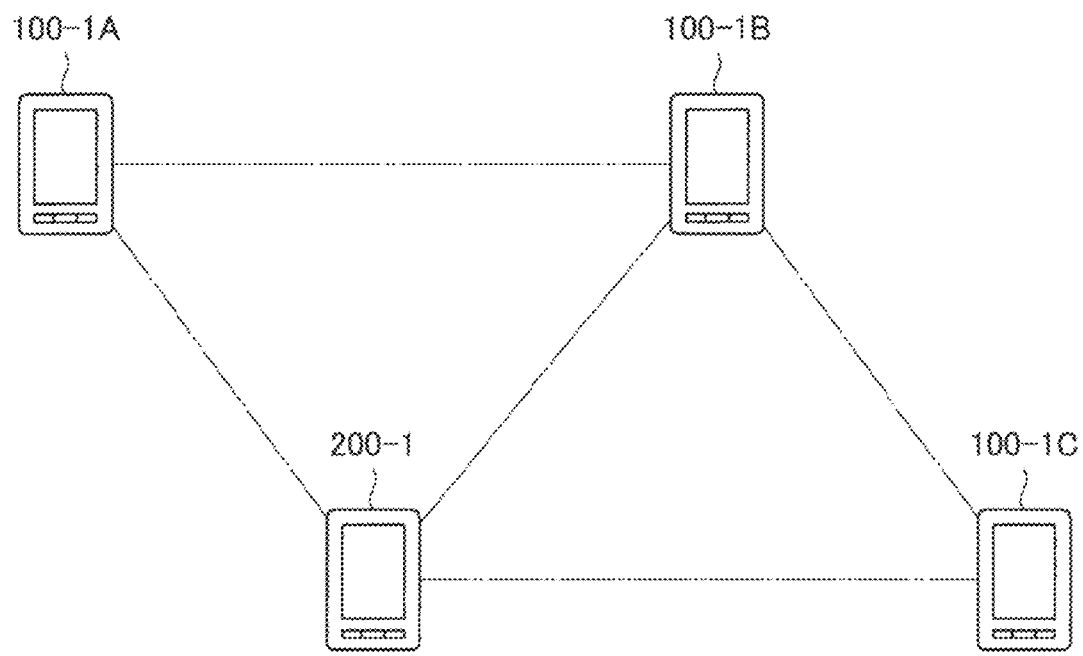
FIG. 2 is a diagram illustrating an example of an overall configuration of a communication system according to a first embodiment of the present disclosure.

First, a configuration of the communication system according to the first embodiment of the present disclosure has been described with reference to FIG. 2. FIG. 2 is a diagram illustrating an example of an overall configuration of the communication system according to the first embodiment of the present disclosure.

The communication system according to the embodiment includes STAs 100-1 and AP 200-1. For example, the communication system according to the embodiment includes STAs 100-1A to 100-1C and the AP 200-1, as illustrated in FIG. 2. The AP 200-1 and the STAs 100-1A to 100-1C can communicate with each other. Hereinafter, in a case in which it is not necessary to distinguish the STAs 100-1 and the AP 200-1 from each other, the STAs 100-1 and the AP 200-1 are also simply referred to as the communication devices 100-1 (200-1).

<2-2. Configuration of Communication Device>

Figure 3:
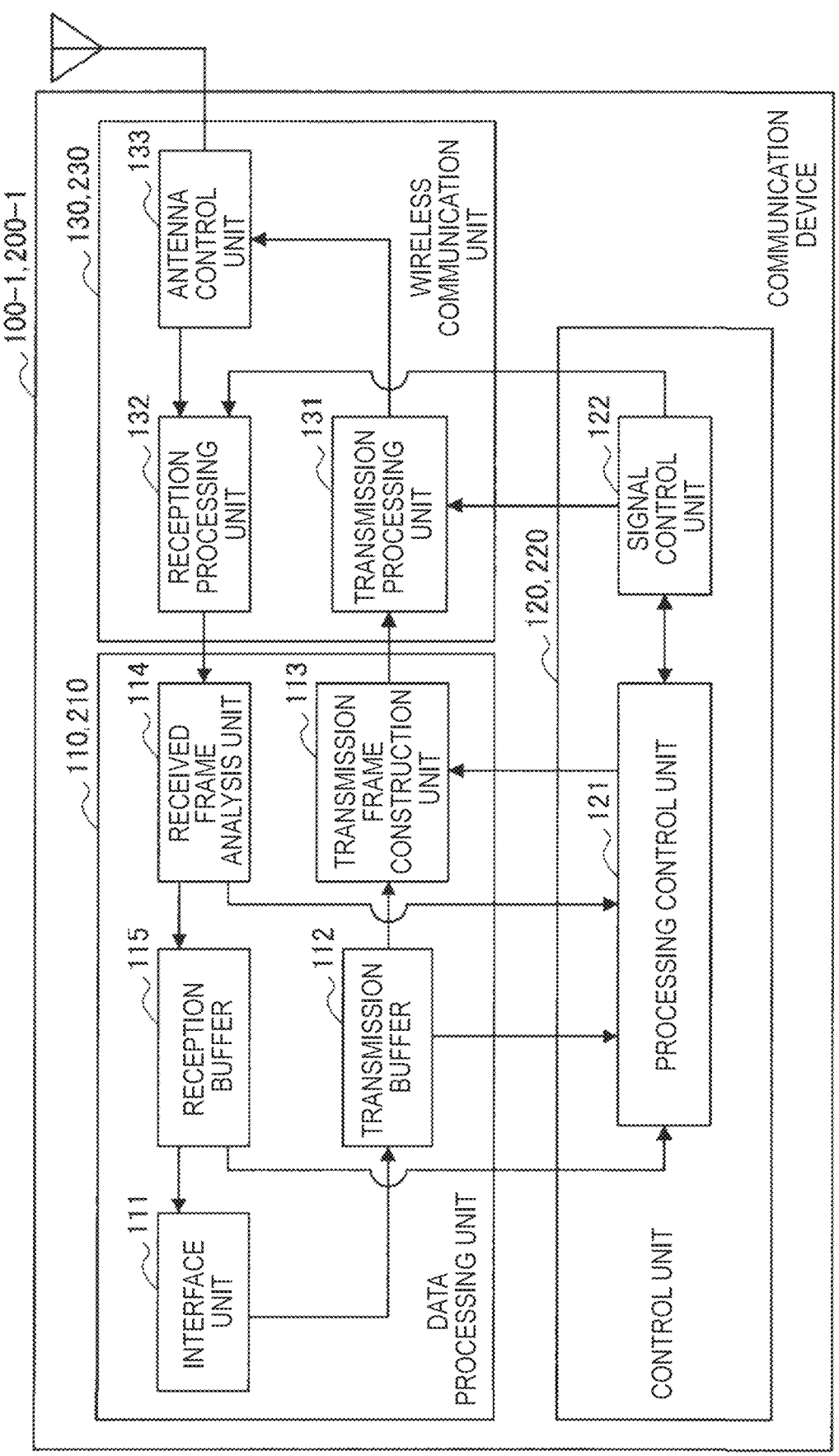
FIG. 3 is a block diagram illustrating an example of an overall functional configuration of a communication device according to the embodiment.

Next, a functional configuration of the communication device 100-1 (200-1) according to the embodiment will be described with reference to FIG. 3. FIG. 3 is a block diagram illustrating an example of an overall functional configuration of the communication device 100-1 (200-1) according to the embodiment.

The communication device 100-1 (200-1) includes a data processing unit 110 (210), a control unit 120 (220), and a wireless communication unit 130 (230) as a communication unit, as illustrated in FIG. 3.

(Data Processing Unit)

As illustrated in FIG. 3, the data processing unit 110 (210) includes an interface unit 111, a transmission buffer 112, a transmission frame construction unit 113, a received frame analysis unit 114, and a reception buffer 115.

The interface unit 111 is an interface connected to another functional configuration of the communication device 100-1 (200-1). Specifically, the interface unit 111 executes the other functional configuration, for example, receives data desired to be transmitted from an application or supplies reception data to the application.

The transmission buffer 112 stores data to be transmitted. Specifically, the transmission buffer 112 stores data obtained by the interface unit 111.

The transmission frame construction unit 113 generates a frame to be transmitted. Specifically, the transmission frame construction unit 113 generates data to be stored in the transmission buffer 112 or generates a frame on the basis of control information set by the control unit 120 (220). For example, the transmission frame construction unit 113 executes a process of generating a frame (a packet) from data acquired from the transmission buffer 112 and executing, for example, addition of a media access control (MAC) header for MAC and addition of an error detection code to the generated frame.

The received frame analysis unit 114 analyzes a received frame. Specifically, the received frame analysis unit 114 determines a destination of a frame received by the wireless communication unit 130 (230) and acquires data or control information included in the frame. For example, the received frame analysis unit 114 acquires data included in a received frame by executing, for example, analysis of a MAC header, detection and correction of a code error, and a reordering process on the received frame.

The reception buffer 115 stores received data. Specifically, the reception buffer 115 stores the data acquired by the received frame analysis unit 114.

(Control Unit)

As illustrated in FIG. 3, the control unit 120 (220) includes a processing control unit 121 and a signal control unit 122.

The processing control unit 121 controls an operation of the data processing unit 110 (210). Specifically, the processing control unit 121 controls occurrence of communication. For example, when a communication connection request occurs, the processing control unit 121 causes the data processing unit 110 to generate a frame related to a connection process or a certification process such as an association process or an authentication process.

In addition, the processing control unit 121 controls the generation of the frame on the basis of a data storage situation, a received-frame analysis result, or the like in the transmission buffer 112. For example, in a case in which data is stored in the transmission buffer 112, the processing control unit 121 instructs the transmission frame construction unit 113 to generate a data frame in which the data is stored. In addition, in a case in which the received frame analysis unit 114 confirms that a frame is received, the processing control unit 121 instructs the transmission frame construction unit 113 to generate a confirmation response frame as a response to the received frame.

The signal control unit 122 controls an operation of the wireless communication unit 130 (230). Specifically, the signal control unit 122 controls transmission and reception processes of the wireless communication unit 130 (230). For example, the signal control unit 122 causes the wireless communication unit 130 (230) to set parameters for transmission and reception on the basis of an instruction of the processing control unit 121.

(Wireless Communication Unit)

As illustrated in FIG. 3, the wireless communication unit 130 (230) includes a transmission processing unit 131, a reception processing unit 132, and an antenna control unit 133.

The transmission processing unit 131 performs a frame transmission process. Specifically, the transmission processing unit 131 generates a signal to be transmitted on the basis of a frame supplied from the transmission frame construction unit 113. More specifically, the transmission processing unit 131 generates a signal related to a frame on the basis of a parameter set by an instruction from the signal control unit 122. For example, the transmission processing unit 131 generates a symbol stream by encoding, interleaving, and modulating a frame supplied from the data processing unit 110 in conformity with coding and modulation schemes or the like instructed by the control unit 120. In addition, the transmission processing unit 131 converts a signal related to the symbol stream obtained through a process on the front stage into an analog signal and executes amplification, filtering, and frequency up-conversion on the analog signal.

Moreover, the transmission processing unit 131 may execute a frame multiplexing process. Specifically, the transmission processing unit 131 executes a process related to frequency division multiplexing or space division multiplexing.

The reception processing unit 132 executes a frame reception process. Specifically, the reception processing unit 132 restores a frame on the basis of a signal supplied from the antenna control unit 133. For example, the reception processing unit 132 acquires a symbol stream by executing reverse processes to the processes at the time of transmission of the signal, for example, frequency down-conversion, digital signal conversion, and the like, on a signal obtained from the antenna. In addition, the reception processing unit 132 acquires a frame by demodulating and decoding the symbol stream obtained through the process on the front stage and supplies the acquired frame to the data processing unit 110 (210) or the control unit 120 (220).

Moreover, the reception processing unit 132 may execute a process related to demultiplexing of the multiplexed frame. Specifically, the reception processing unit 132 performs a process related to demultiplexing on a frame subjected to frequency division multiplexing or space division multiplexing.

In addition, the reception processing unit 132 may estimate a channel gain. Specifically, the reception processing unit 132 calculates complex channel gain information from a preamble portion or a training signal portion of a signal obtained from the antenna control unit 133. Moreover, the calculated complex channel gain information is used in the process related to frame multiplexing and a process of frame demultiplexing.

The antenna control unit 133 transmits and receives a signal via at least one antenna. Specifically, the antenna control unit 133 transmits a signal generated by the transmission processing unit 131 via the antenna and supplies a signal received via the antenna to the reception processing unit 132. In addition, the antenna control unit 133 may execute control related to space division multiplexing.

Moreover, although not illustrated in FIG. 3, the communication device 100-1 (200-1) may include an input unit and an output unit connected via the interface unit 111. For example, the input unit acquires input information or the like of a user from an input device such as a keyboard or a mouse. Then, the input information or the like is stored as data in the transmission buffer via the interface unit 111. In addition, data stored in the reception buffer is supplied to the output unit via the interface unit 111 and the output unit causes a display, a speaker, or the like to output an image, audio or music, or the like on the basis of supplied data.

<2-3. Functional Details of Communication Device>

Next, functional details of the communication device 100-1 (200-1) according to the first embodiment of the present disclosure will be described.

(A. Functional Details of STA)

First, the functional details of the STA 100-1 will be described.

(A-1. Decision of Tentative AID)

The STA 100-1 decides a second association identifier (hereinafter also referred to as a tentative AID). Specifically, the control unit 120 decides a tentative AID used in the self-device within a setting range of the tentative AID. More specifically, the control unit 120 decides the tentative AID that the self-device uses within the setting range of the tentative AID different from a setting range of an AID. For example, in a case in which the AP 200-1 is found on the basis of reception of a beacon frame or the like transmitted from the AP 200-1 or connection with the AP 200-1 is performed in this case, the control unit 120 decides the tentative AID that the self-device uses among tentative AIDs prepared separately from the setting range of the AID. Further, a process of deciding the tentative AID will be described with reference to FIG. 4. FIG. 4 is a diagram illustrating an example of a setting range of a tentative AID according to the embodiment.

First, the setting range of the AID is generally defined in conformity with a standard. For example, as illustrated in FIG. 4, the setting range of the AID is 0x0001 to 0x07D7 in the IEEE 802.11 standard.

On the other hand, the setting range of the tentative AID according to the embodiment is prepared separately from the setting range of the AID. For example, as illustrated in FIG. 4, the setting range of the tentative AID is 0x0800 to 0x08FF. The control unit 120 decides a tentative AID that the self-device uses from the setting range of the tentative AID. Moreover, of course, the setting range of the tentative AID may be another setting range different from the setting range illustrated in FIG. 4.

In addition, the control unit 120 decides a tentative AID different from tentative AIDs used in the other STAs 100-1 as the tentative AID of the self-device. For example, the control unit 120 causes a storage unit to store the tentative AIDs included in received frames of the other STAs 100-1 and decides a tentative AID different from the stored tentative AIDs of the other STAs 100-1 as a tentative AID of the self-device. Moreover, a notification of the tentative AIDs used in the other STAs 100-1 may be issued by the AP 200-1. For example, the AP 200-1 transmits a beacon frame or the like including information indicating the tentative AID registered in the AP 200-1. The STA 100-1 receiving the beacon frame or the like decides a tentative AID other than the registered tentative AIDs as a tentative AID of the self-device.

In addition, the tentative AID is decided for each AP 200-1. For example, whenever the AP 200-1 is found or in a case in which connection with the AP 200-1 is desired, the control unit 120 manages the tentative AID for each AP 200-1 by deciding a tentative AID to be applied to the AP 200-1 and associating the decided tentative AID with the AP 200-1.

Moreover, the example in which the setting range of the tentative AID is different from the setting range of the AID has been described, but the tentative AID may be decided from the setting range of the AID. For example, the control unit 120 decides the tentative AID of the self-device from the setting range 0x0001 to 0x07D7 of the AID described above. Moreover, as in a case in which the tentative AID is decided from the setting range of the tentative AID, the control unit 120 may decide an AID other than the AID already set in another STA as the tentative AID of the self-device.

(A-2. Notification and Registration of Tentative AID)

Figure 5:
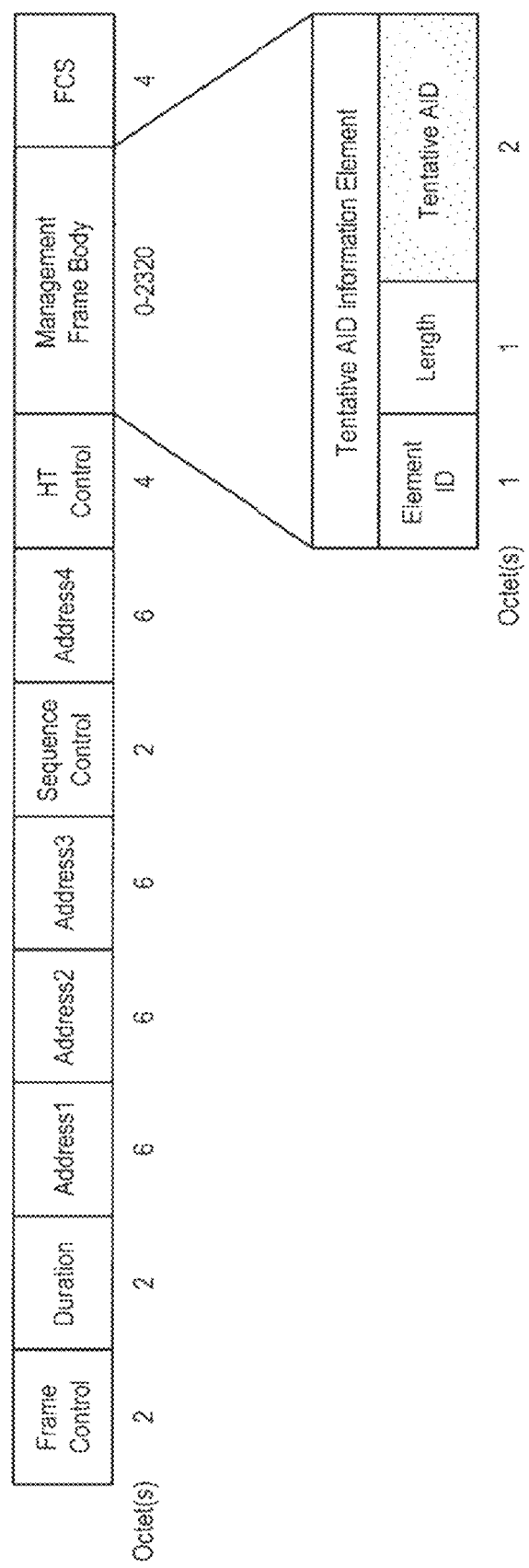
FIG. 5 is a diagram illustrating a configuration example of a tentative AID notification frame according to the embodiment.

The STA 100-1 transmits a tentative AID notification frame as a first frame including the tentative AID. Specifically, the control unit 120 causes the data processing unit 110 to generate the tentative AID notification frame including information indicating the decided tentative AID. Then, the wireless communication unit 130 transmits the generated tentative AID notification frame to the AP 200-1. Further, the tentative AID notification frame according to the embodiment will be described in detail with reference to FIG. 5. FIG. 5 is a diagram illustrating a configuration example of the tentative AID notification frame according to the embodiment.

As illustrated in FIG. 5, the tentative AID notification frame includes fields such as Frame Control, Duration, Address1 to Address3, Sequence Control, Address4, HT Control, Management Frame Body, and Frame Check Sequence (FCS). Moreover, in FIG. 5, an example in which the tentative AID notification frame is a management frame is illustrated, but the tentative AID notification frame may be another type of frame such as a control frame or a data frame.

As illustrated in FIG. 5, Management Frame Body includes a Tentative AID Information Element field. The Tentative AID Information Element field includes fields such as Element ID, Length, and Tentative AID. Information indicating a tentative AID is stored in the Tentative AID field.

In addition, the STA 100-1 registers a tentative AID. Specifically, when a confirmation response frame for a tentative AID notification frame is received, the control unit 120 registers the tentative AID included in the tentative AID notification frame. For example, the control unit 120 causes the storage unit to store the information indicating the tentative AID included in the tentative AID notification frame by which a confirmation response is received.

Moreover, in a case in which the confirmation response frame is not received, the STA 100-1 changes the tentative AID and retransmits the tentative AID notification frame. Specifically, the control unit 120 causes the wireless communication unit 130 to transmit the tentative AID notification frame including the tentative AID different from the tentative AID included in the tentative AID notification frame by which the confirmation response frame has not been received. For example, in a case in which the confirmation response frame is not received before a predetermined time has passed from the transmission of the tentative AID notification frame, the control unit 120 re-decides the tentative AID and causes the data processing unit 110 to generate the tentative AID notification frame including the re-decided AID. Then, the generated tentative AID notification frame is transmitted by the wireless communication unit 130.

On the other hand, since there is a possibility of the tentative AID notification frame not being received, the STA 100-1 may retransmit the tentative AID notification frame without changing the tentative AID.

(A-3. Sounding Process Using Tentative AID)

The STA 100-1 receives a frame related to a channel information request as a second frame including information related to the tentative AID. Specifically, the frame related to the channel information request includes a frame for issuing a notification of transmission of a channel information request frame (hereinafter also referred to as a prior notification frame).

More specifically, when the prior notification frame is received from the AP 200-1, the data processing unit 110 acquires information indicating a tentative AID included in the prior notification frame. The control unit 120 determines whether the tentative AID of the self-device is included in the acquired information indicating the tentative AID. In a case in which the control unit 120 determines that the tentative AID of the self-device is included, the control unit 120 causes the wireless communication unit 130 to prepare a sounding process and wait for the channel information request frame. Then, when the channel information request frame is received from the AP 200-1, the wireless communication unit 130 executes the sounding process such as estimation of a channel gain.

Figure 6:
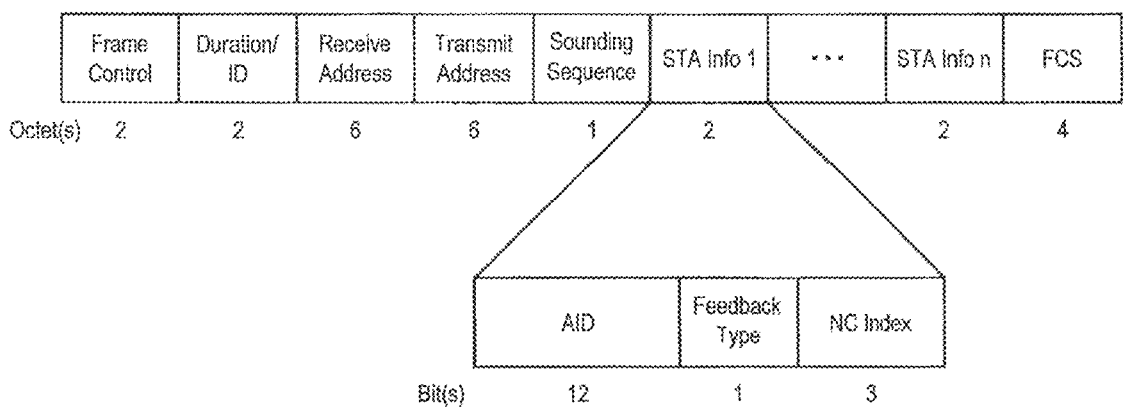
FIG. 6 is a diagram illustrating a configuration example of a VHT NDP announcement frame.

For example, the prior notification frame is a VHT NDP Announcement frame and the channel information request frame is a null data packet (NDP) frame. Further, the prior notification frame according to the embodiment will be described in detail with reference to FIG. 6. FIG. 6 is a diagram illustrating a configuration example of the VHT NDP Announcement frame.

As illustrated in FIG. 6, the VHT NDP Announcement frame includes fields such as Frame Control, Duration/ID, Receive Address, Transmit Address, Sounding Sequence, n pieces of STA Info, and FCS. In the STA Info field, information regarding the STA 100-1 which is a transmission target of a subsequent NDP frame or a beamforming report poll (BRP) frame to be described below is stored.

As illustrated in FIG. 6, the STA Info field includes fields such as AID, Feedback Type, and number of columns (NC) Index. Here, in the AID field, information indicating an AID is stored in the related art, but information indicating a tentative AID is stored in the embodiment. Moreover, in a case in which an AID has already been allocated in the STA 100-1 which is a transmission target, the information indicating the AID may be stored or the information indicating the tentative AID and the information indicating the AID may coexist in the VHT NDP Announcement frame.

In addition, when the channel information request frame is received, the STA 100-1 transmits the channel information notification frame as a response to the channel information request frame. Specifically, when the NDP frame is received, the STA 100-1 transmits the channel information notification frame including the channel information obtained through the sounding process as a response to the NDP frame to the AP 200-1.

Moreover, when another channel information request frame destined for the self-device and different from the NDP frame is received, the STA 100-1 may transmit the channel information notification frame as a response to the other channel information request frame. More specifically, when the other channel information request frame is received from the AP 200-1, the data processing unit 110 acquires information indicating the tentative AID included in the other channel information request frame. The control unit 120 determines whether the tentative AID of the self-device is included in the acquired information indicating the tentative AID. In a case in which the control unit 120 determines that the tentative AID of the self-device is included, the control unit 120 causes the data processing unit 110 to generate the channel information notification frame including channel information acquired through the sounding process. Then, the wireless communication unit 130 transmits the generated channel information notification frame to the AP 200-1.

Figure 7:
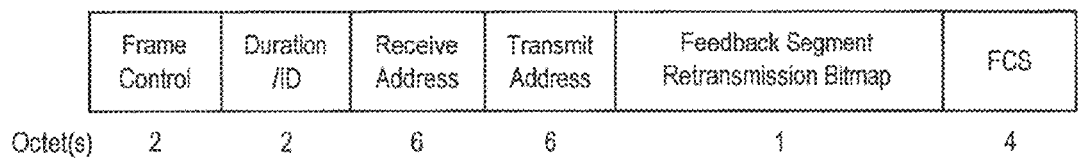
FIG. 7 is a diagram illustrating a configuration example of a beamforming report poll (BRP) frame.

For example, the other channel information request frame is a BRP frame and the channel information notification frame is a VHT compressed beamforming (VCB) frame. Further, the channel information request frame and the channel information notification frame according to the embodiment will be described with reference to FIGS. 7 and 8. FIG. 7 is a diagram illustrating a configuration example of the BRP frame. FIG. 8 is a diagram illustrating a configuration example of the VCB frame.

As illustrated in FIG. 7, the BRP frame includes fields such as Frame Control, Duration/ID, Receive Address, Transmit Address, Feedback Segment Retransmission Bitmap, and FCS. The fields are substantially the same as the fields of the BRP frame of the related art, and therefore the description thereof will be omitted. Moreover, the information indicating the tentative AID may be stored in the Received Address field.

In addition, as illustrated in FIG. 8, the VCB frame includes fields such as Category, VHT Action, VHT Compressed Beamforming Report, and Multi User (MU) Exclusive Beamforming Report. The fields are substantially the same as the fields of the BRP frame of the related art, and therefore the description thereof will be omitted. Moreover, the VCB frame is a frame for which a confirmation response is not requested.

(A-4. Data Transmission and Reception Using Tentative AID)

The STA 100-1 receives a frame including the tentative AID as destination information of a frame. Specifically, the STA 100-1 executes a frame reception process on the basis of whether the tentative AID included in the received frame is the tentative AID of the self-device.

More specifically, when a frame with the VHT PPDU format is received from the AP 200-1, the wireless communication unit 130 acquires the tentative AID included in the header of the frame. Subsequently, the wireless communication unit 130 determines whether the acquired tentative AID is the tentative AID of the self-device. When the wireless communication unit 130 determines that the acquired tentative AID is the tentative AID of the self-device, the wireless communication unit 130 receives the frame with the VHT PPDU format up to the tail of the frame and provides a data frame obtained in the reception to the data processing unit 110. Moreover, the frame with the VHT PPDU format is not limited to the data frame, but may be another type of frame such as a management frame.

In addition, the data frame may be transmitted toward the plurality of STAs 100-1 at one time. Specifically, the data frame is multiplexed. For example, the data frame is subjected to time division multiplexing, code division multiplexing, frequency division multiplexing, orthogonal frequency division multiplexing, or space division multiplexing. Moreover, the data frame may be connected (aggregated).

Figure 9:
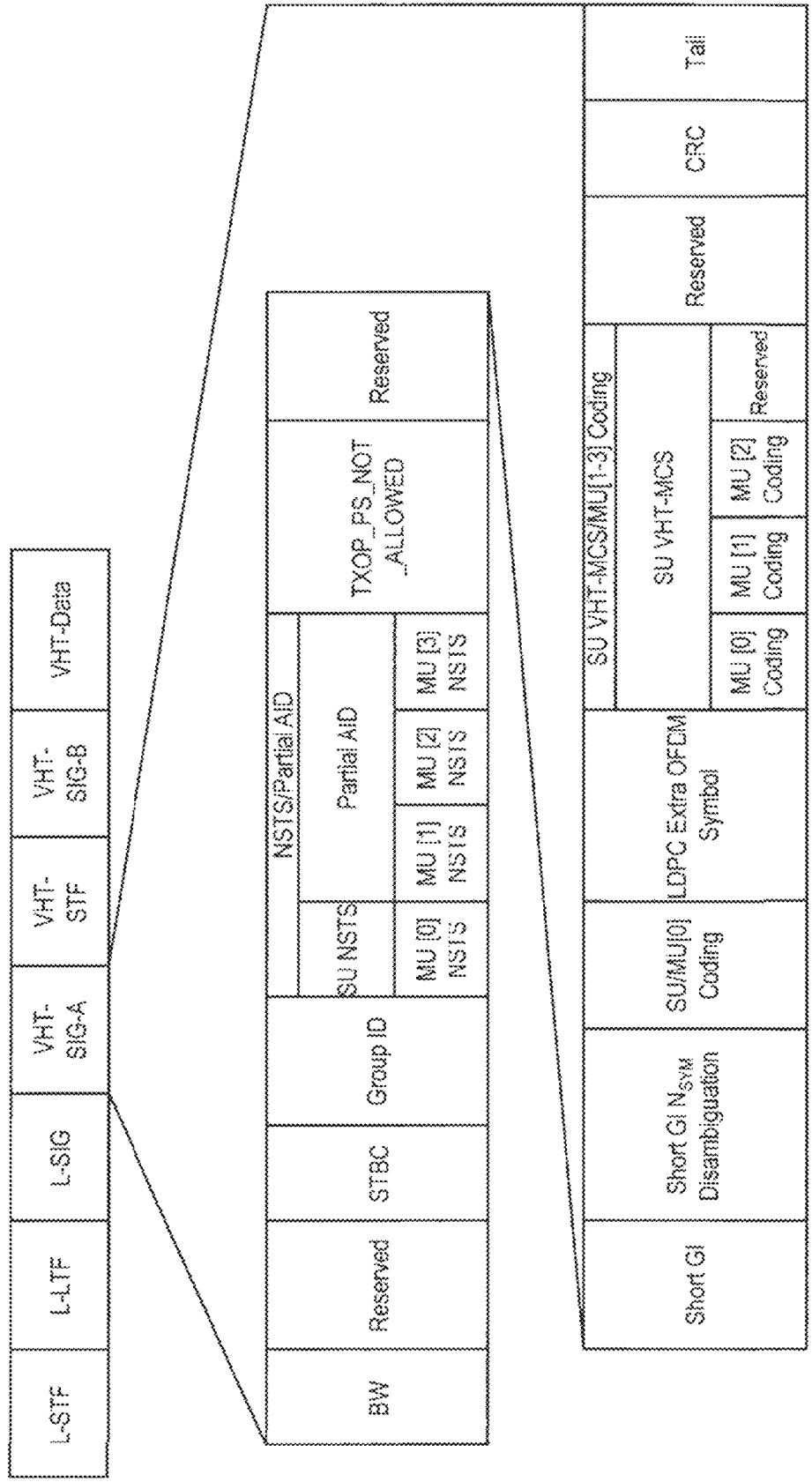
FIG. 9 is a diagram illustrating a configuration example of a frame with a VHT PPDU format.

Further, the frame with the VHT PPDU format will be described with reference to FIG. 9. FIG. 9 is a diagram illustrating a configuration example of the frame with the VHT PPDU format.

As illustrated in FIG. 9, the frame with the VHT PPDU format includes fields such as Legacy-Short Training Field (L-STF), Legacy-Long Training Field (L-LTF), Legacy-Signal Field (L-SIG), VHT-SIG-A, VHT-STF, VHT-SIG-B, and VHT-Data.

As illustrated in FIG. 9, the VHT-SIG-A field includes fields such as Bandwidth (BW), Space Time Block Coding (STBC), Group ID, NSTS/Partial AID, TXOP_PS_NOT_ALLOWED, Short Guard Interval (GI), Short GI $N_{SYM}$ Disambiguation, Single User (SU)/MU(0) Coding, Low Density Parity Check (LDPC) Extra Orthogonal Frequency Division Multiplexing (OFDM) Symbol, SU VHT-Modulation and Coding Set (MCS)/MU (1-3) Coding, Cyclic Redundancy Check (CRC), and Tail.

As illustrated in FIG. 9, the NSTS/Partial AID field includes fields such as SU NSTS and Partial AID in a case in which a communication target is a single user, and includes fields such as MU(0) NSTS to MU(3) NSTS in a case in which the communication target is multiple users. Information decided on the basis of the AID is stored in the partial AID field in the related art, but information decided on the basis of the tentative AID is stored in the embodiment. For example, information regarding a part of the tentative AID, for example, information regarding a specific bit, is stored in the Partial AID field.

In addition, the STA 100-1 transmits a frame including the tentative AID as transmission source information of the frame. Specifically, when a data transmission request to the AP 200-1 occurs, the control unit 120 acquires the tentative AID associated with the AP 200-1 from the storage unit. Subsequently, the control unit 120 causes the data processing unit 110 to generate a data frame. Then, the wireless communication unit 130 transmits the frame with the VHT PPDU format on the basis of the generated data frame and the header including the acquired tentative AID to the AP 200-1. For example, the wireless communication unit 130 transmits the frame with the VHT PPDU format including the header in which the tentative AID is included in VHT SIG to the AP 200-1.

(B. Functional Details of AP)

Next, the functional details of the AP 200-1 will be described.

(B-1. Reception and Registration of Tentative AID)

The AP 200-1 receives a tentative AID notification frame including the tentative AID. Specifically, when the tentative AID notification frame is received from the STA 100-1, the data processing unit 210 acquires the information indicating the tentative AID included in the tentative AID notification frame.

In addition, the AP 200-1 registers the acquired information indicating the tentative AID. Specifically, when the information indicating the tentative AID is acquired by the data processing unit 210, the control unit 220 determines whether the tentative AID overlaps. When the control unit 220 determines that the tentative AID does not overlap, the control unit 220 causes the storage unit to store information indicating the tentative AID.

In addition, the AP 200-1 transmits a confirmation response frame for the tentative AID notification frame on the basis of whether the tentative AID can be used. Specifically, in a case in which the tentative AID is registered, that is, the tentative AID does not overlap, the control unit 220 causes the data processing unit 210 to generate the confirmation response frame for the tentative AID notification frame including the information indicating the registered tentative AID. Then, the generated confirmation response frame is transmitted to the STA 100-1 by the wireless communication unit 230.

(B-2. Sounding Process Using Tentative AID)

The AP 200-1 transmits a frame related to the channel information request including the information related to the tentative AID depending on a situation. Specifically, the AP 200-1 transmits a prior notification frame including the information indicating the tentative AID. For example, when a data transmission request destined for the STA 100-1 occurs, the control unit 220 acquires the tentative AID of the STA 100-1 which is a destination. Subsequently, the control unit 220 causes the data processing unit 210 to generate a VHT NDP Announcement frame including the information indicating the acquired tentative AID. Then, the generated VHT NDP Announcement frame is transmitted to the STA 100-1 by the wireless communication unit 230.

Subsequently, the AP 200-1 transmits the channel information request frame. For example, the control unit 220 causes the data processing unit 210 to generate the NDP frame to collect channel information after a predetermined time has passed from the transmission of the prior notification frame. Then, the generated NDP frame is transmitted to the STAs 100-1 by the wireless communication unit 230. Thereafter, the AP 200-1 receives the channel information notification frame as a response to the NDP frame from the STA 100-1. In addition, the AP 200-1 may collect the channel information by individually transmitting another channel information request frame different from the NDP frame to the STAs 100-1. Specifically, after the VCB frame to the NDP frame is received, the control unit 220 causes the data processing unit 210 to generate the BRP frame destined for the STA 100-1 having not receiving the VCB frame. Then, the generated VCB frame is transmitted to the STA 100-1 by the wireless communication unit 230.

In addition, the AP 200-1 receives the channel information notification frame as a response to the channel information request frame. For example, when the VCB frame is received after the transmission of the NDP frame or the BRP frame, the data processing unit 210 acquires the channel information included in the received VCB frame. Then, the control unit 220 causes the storage unit to store the acquired channel information.

(B-3. Data Transmission and Reception Using Tentative AID)

The AP 200-1 transmits a frame including the tentative AID as destination information of the frame. Specifically, when a data transmission request to the STA 100-1 occurs, the control unit 220 acquires the tentative AID associated with the STA 100-1. Subsequently, the control unit 220 causes the data processing unit 210 to generate a data frame including data desired to be delivered. Then, the wireless communication unit 230 transmits the frame with the VHT PPDU format to the STA 100-1 on the basis of the header including the acquired tentative AID and the generated data frame.

In addition, the AP 200-1 receives the frame including the tentative AID as transmission source information of the frame. Specifically, when the frame with the VHT PPDU format is received from the STA 100-1, the wireless communication unit 230 acquires the tentative AID included in the header of the frame with the VHT PPDU format. Subsequently, the wireless communication unit 230 determines whether the acquired tentative AID is the registered AID. When the wireless communication unit 230 determines that the acquired tentative AID is the registered AID, the wireless communication unit 230 receives the frame with the VHT PPDU format up to the tail of the frame and provides the data frame obtained in the reception to the data processing unit 110. Conversely, when the wireless communication unit 230 determines that the acquired tentative AID is an unregistered tentative AID, the wireless communication unit 230 may stop the frame reception process.

<2-4. Process of Communication Device>

Next, a process of the communication device 100-1 (200-1) according to the embodiment will be described.

(Overview of Tentative AID Registration Process)

Figure 10:
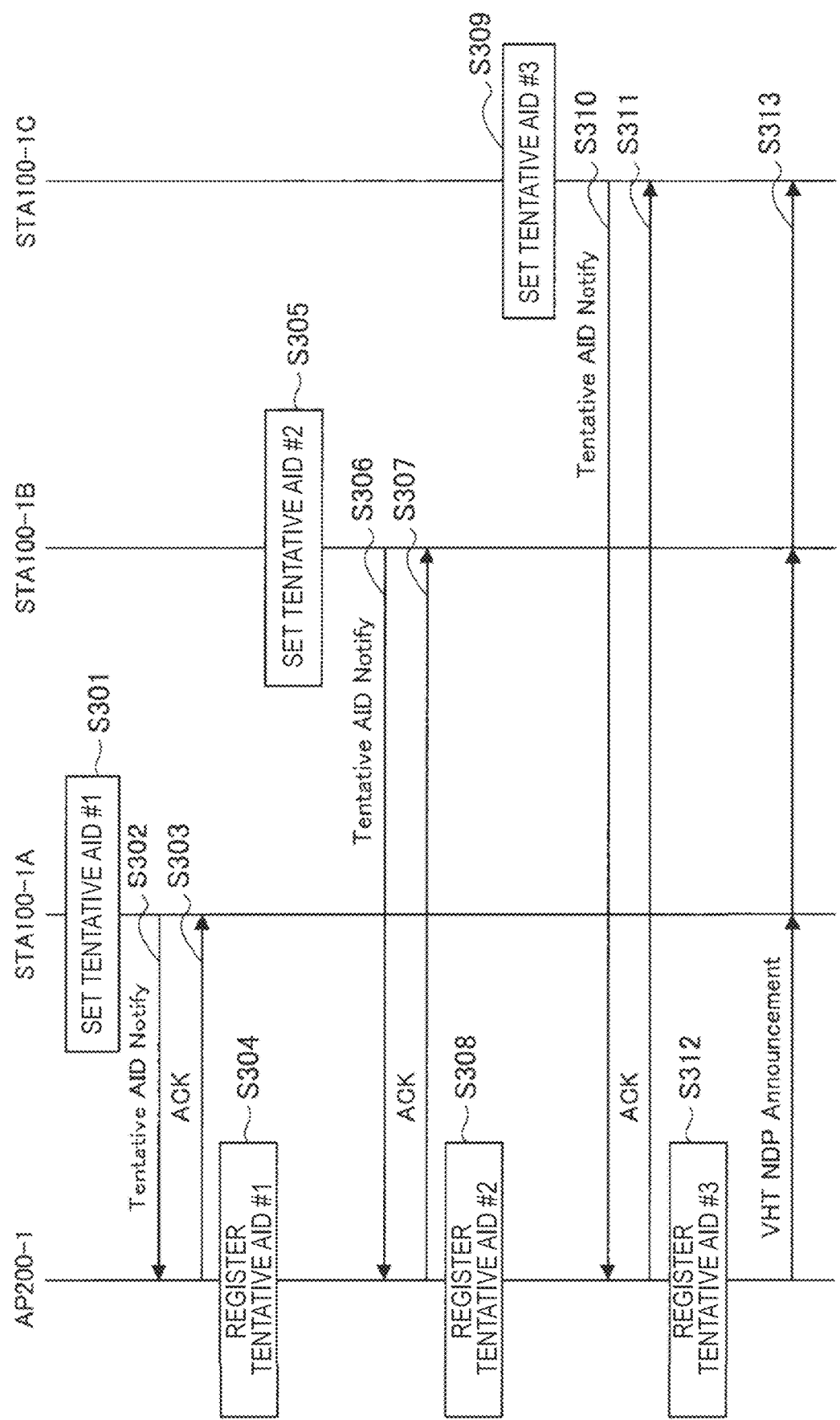
FIG. 10 is a sequence diagram conceptually illustrating an overview of a tentative AID registration process according to the embodiment.

First, an overview of the tentative AID registration process in the communication device 100-1 (200-1) according to the embodiment will be described with reference to FIG. 10. FIG. 10 is a sequence diagram conceptually illustrating an overview of the tentative AID registration process according to the embodiment. Moreover, the details of each process will be described below.

The STA 100-1A sets tentative AID #1, for example, when a communication request occurs (step S301).

Subsequently, the STA 100-1A transmits a Tentative AID Notify frame (tentative AID notification frame) including the set tentative AID #1 to the AP 200-1 (step S302).

The AP 200-1 receiving the Tentative AID Notify frame transmits an ACK frame to the Tentative AID Notify frame to the STA 100-1A (step S303).

Subsequently, the AP 200-1 registers tentative AID #1 included in the received Tentative AID Notify frame (step S304).

Subsequently, the registration process such as the foregoing steps S301 to S304 are executed in the STA 100-1B and the STA 100-1C (step S305 to S312).

Thereafter, the AP 200-1 transmits the VHT NDP Announcement frame including the registered tentative AID #1 to AID #3 in a case in which communication with each STA 100 is executed (step S313). Moreover, the sounding process will be described below with reference to a sequence diagram and a flowchart.

(Details of Tentative AID Registration Process)

Figure 11:
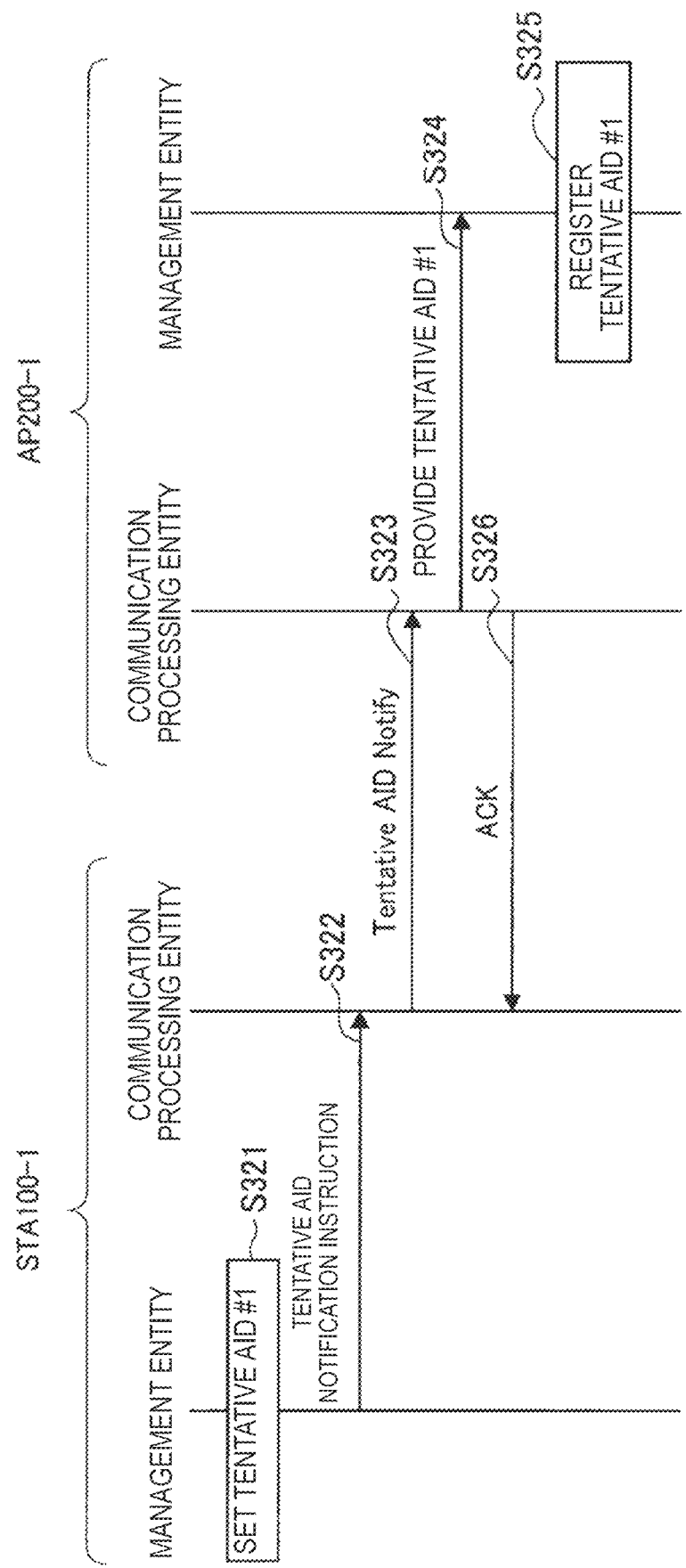
FIG. 11 is a sequence diagram conceptually illustrating the details of the tentative AID registration process according to the embodiment.

Next, the details of the tentative AID registration process in the communication device 100-1 (200-1) according to the embodiment will be described with reference to FIG. 11. FIG. 11 is a sequence diagram conceptually illustrating the details of the tentative AID registration process according to the embodiment.

A management entity of the STA 100-1 sets tentative AID #1 (step S321). Specifically, when a data transmission request to the AP 200-1 occurs, the control unit 120 decides one tentative AID #1 of the self-device in regard to the AP 200-1 at random within the setting range of the tentative AID.

Subsequently, the management entity of the STA 100-1 instructs the wireless communication unit 130 to issue a notification of the tentative AID (step S322). Specifically, when the tentative AID of the self-device is decided, the control unit 120 causes the data processing unit 110 to generate the Tentative AID Notify frame including the information indicating tentative AID #1.

Subsequently, the communication processing entity of the STA 100-1 transmits the Tentative AID Notify frame to the AP 200-1 (step S323). Specifically, the wireless communication unit 130 transmits the Tentative AID Notify frame generated by the data processing unit 110 to the AP 200-1.

The communication processing entity of the AP 200-1 receiving the Tentative AID Notify frame provides the management entity with tentative AID #1 included in the received Tentative AID Notify frame (step S324). Specifically, when the Tentative AID Notify frame is received by the wireless communication unit 230, the data processing unit 210 acquires the information indicating tentative AID #1 included in the Tentative AID Notify frame. Then, the acquired information indicating tentative AID #1 is provided to the control unit 220.

Subsequently, the management entity of the AP 200-1 registers the provided tentative AID #1 (step S325). Specifically, the control unit 220 causes the storage unit to store tentative AID #1 if tentative AID #1 indicated by the provided information does not overlap with the already registered tentative AID.

Subsequently, the communication processing entity of the AP 200-1 transmits an ACK frame to the received Tentative AID Notify frame to the STA 100-1 (step S326). Specifically, the control unit 220 causes the data processing unit 210 to generate the ACK frame to the Tentative AID Notify frame. Then, the wireless communication unit 130 transmits the generated ACK frame to the STA 100-1.

(Overview of Sounding Process Using Tentative AID

Figure 12:
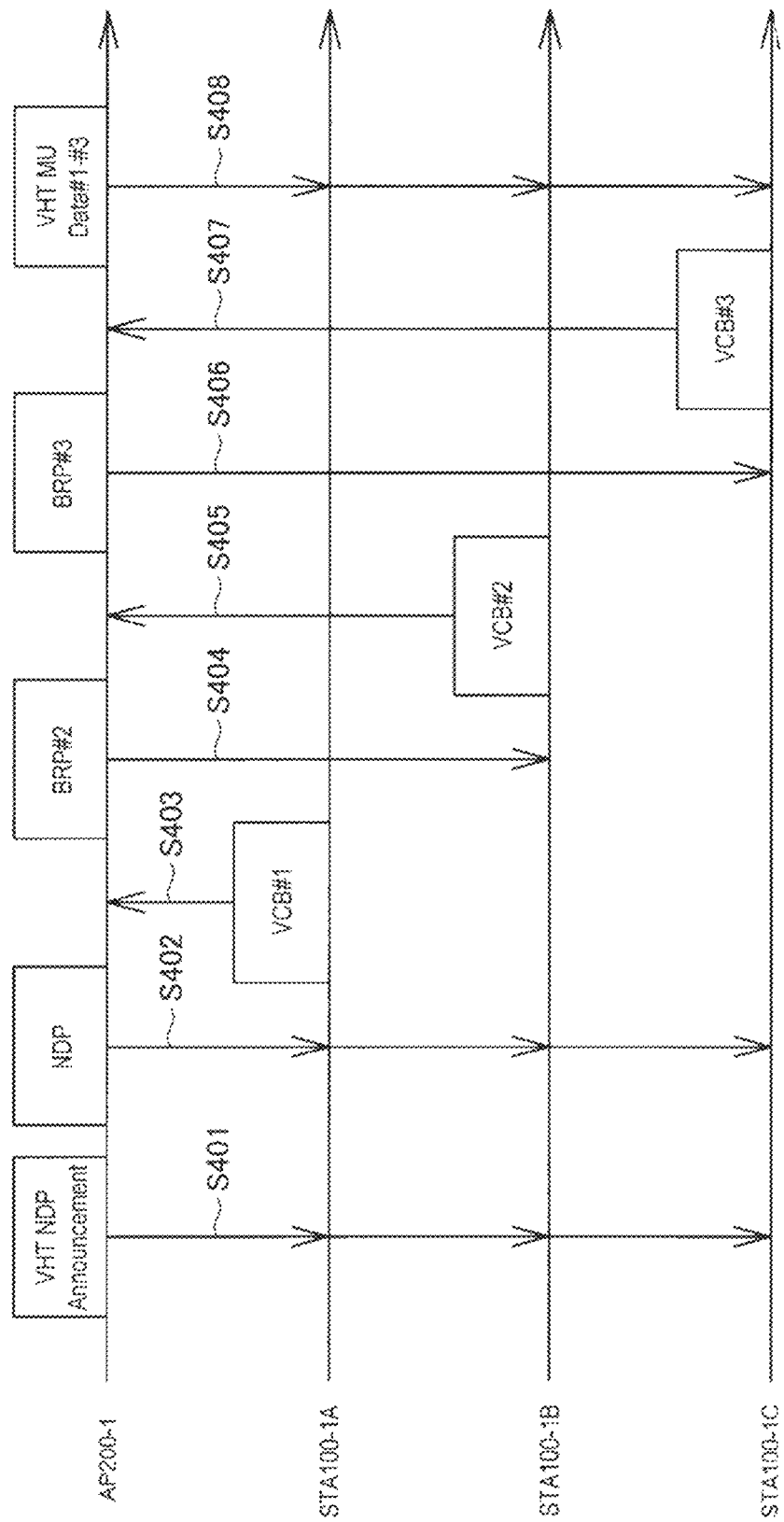
FIG. 12 is a sequence diagram conceptually illustrating an overview of a sounding process using the tentative AID according to the embodiment.

Next, an overview of the sounding process using the tentative AID in the communication device 100-1 (200-1) according to the embodiment will be described with reference to FIG. 12. FIG. 12 is a sequence diagram conceptually illustrating the overview of the sounding process using the tentative AID according to the embodiment. Moreover, the details of each process will be described below.

The AP 200-1 first transmits the VHT NDP Announcement frame including tentative AID #1 to AID #3 to the STAs 100-1A to 100-1C (step S401).

Subsequently, the AP 200-1 transmits the NDP frame to the STAs 100-1A to 100-1C (step S402) and the STA 100-1A receiving the NDP frame transmits a VCB #1 frame to the AP 200-1 (step S403).

The AP 200-1 receiving the VCB #1 frame transmits a BRP #2 frame to the STA 100-1B (step S404) and the STA 100-1B receiving the BRP #2 frame transmits a VCB #2 frame to the AP 200-1 (step S405).

The AP 200-1 receiving the VCB #2 frame transmits a BRP #3 frame to the STA 100-1C (step S406) and the STA 100-1C receiving the BRP #3 frame transits a VCB #3 frame to the AP 200-1 (step S407).

The AP 200-1 receiving the VCB #3 frame transmits VHT MU Data #1 to VHT MU Data #3 subjected to space division multiplexing to the STAs 100-1A to 100-1C (step S408).

(Details of Sounding Process Using Tentative AID

Figure 13:
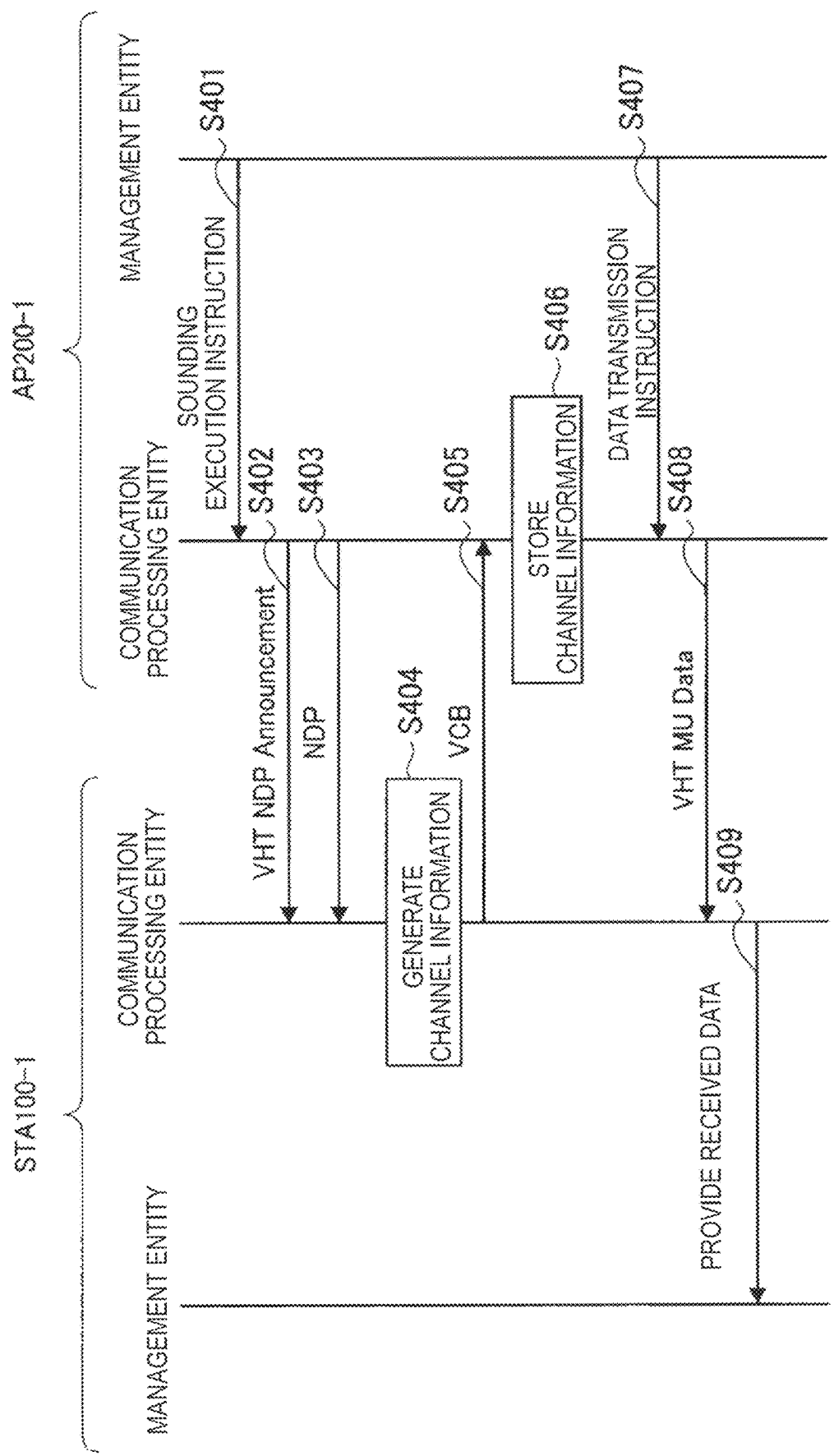
FIG. 13 is a sequence diagram conceptually illustrating the details of the sounding process using the tentative AID according to the embodiment.

Next, the details of the sounding process using the tentative AID in the communication device 100-1 (200-1) according to the embodiment will be described with reference to FIG. 13. FIG. 13 is a sequence diagram conceptually illustrating the details of the sounding process using the tentative AID according to the embodiment.

The management entity of the AP 200-1 instructs the communication processing entity to execute the sounding (step S401). Specifically, when a data transmission request to the STA 100-1 occurs, the control unit 220 causes the data processing unit 210 to generate the VHT NDP Announcement frame including the information indicating the tentative AID of the STA 100-1.

Subsequently, the communication processing entity of the AP 200-1 transmits the VHT NDP Announcement frame to the STA 100-1 (step S402). Specifically, the wireless communication unit 230 transmits the generated VHT NDP Announcement frame to the STA 100-1. Moreover, the STA 100-1 receiving the VHT NDP Announcement frame waits for transmission of the NDP frame in a case in which the VHT NDP Announcement frame includes the information indicating the tentative AID of the self-device.

Subsequently, the communication processing entity of the AP 200-1 transmits the NDP frame to the STA 100-1 (step S403). Specifically, the data processing unit 210 generates the NDP frame after the VHT NDP Announcement frame is transmitted. Then, the wireless communication unit 230 transmits the generated NDP frame to the STA 100-1.

The communication processing entity of the STA 100-1 receiving the NDP frame generates the channel information (step S404). Specifically, when the NDP frame is received, the wireless communication unit 130 executes channel estimation on the basis the reception of the NDP. Then, the wireless communication unit 130 generates the channel information on the basis of the channel estimation result.

Subsequently, the communication processing entity of the STA 100-1 transmits the VCB frame to the AP 200-1 (step S405). Specifically, when the channel information is generated, the data processing unit 110 generates the VCB frame including the channel information as a response to the NDP frame. Then, the wireless communication unit 130 transmits the generated VCB frame to the AP 200-1.

The communication processing entity of the AP 200-1 receiving the VCB frame stores the channel information included in the VCB frame (step S406). Specifically, when the VCB frame is received by the wireless communication unit 230, the data processing unit 210 acquires the channel information included in the VCB frame. Then, the acquired channel information is stored in the storage unit in association with the tentative AID.

Subsequently, the management entity of the AP 200-1 instructs the communication processing entity to transmit data (step S407). Specifically, when the channel information is acquired from all of the STAs 100-1 which are data transmission targets, the control unit 220 causes the data processing unit 210 to generate the data frame including the data desired to be delivered. In addition, the control unit 220 acquires the tentative AID of the STA 100-1 which is a destination of the data frame and notifies the wireless communication unit 230 of the acquired tentative AID.

The communication processing entity of the AP 200-1 receiving the instruction to transmit the data transmits the VHT MU Data frame to the STA 100-1 (step S408). Specifically, the wireless communication unit 230 transmits the frames with the VHT PPDU format based on the plurality of tentative AIDs and the data frame to the plurality of STAs 100-1. Moreover, the frames with the VHT PPDU format can be subjected to the space division multiplexing on the basis of the channel information associated with the tentative AID whose notification has been issued.

The communication processing entity of the STA 100-1 receiving the VHT MU Data frame provides the management entity of the received data (step S409). Subsequently, in a case in which the information indicating the tentative AID of the header of the frame with the VHT PPDU format includes the tentative AID of the self-device, the wireless communication unit 130 executes a process of receiving the data frame. Subsequently, the data frame obtained through the reception process is provided to the data processing unit 110 and the data is acquired from the data frame by the data processing unit 110. Then, the acquired data is provided to the control unit 120 and the like.

(Registration Process Flow of Tentative AID in STA)

Figure 14:
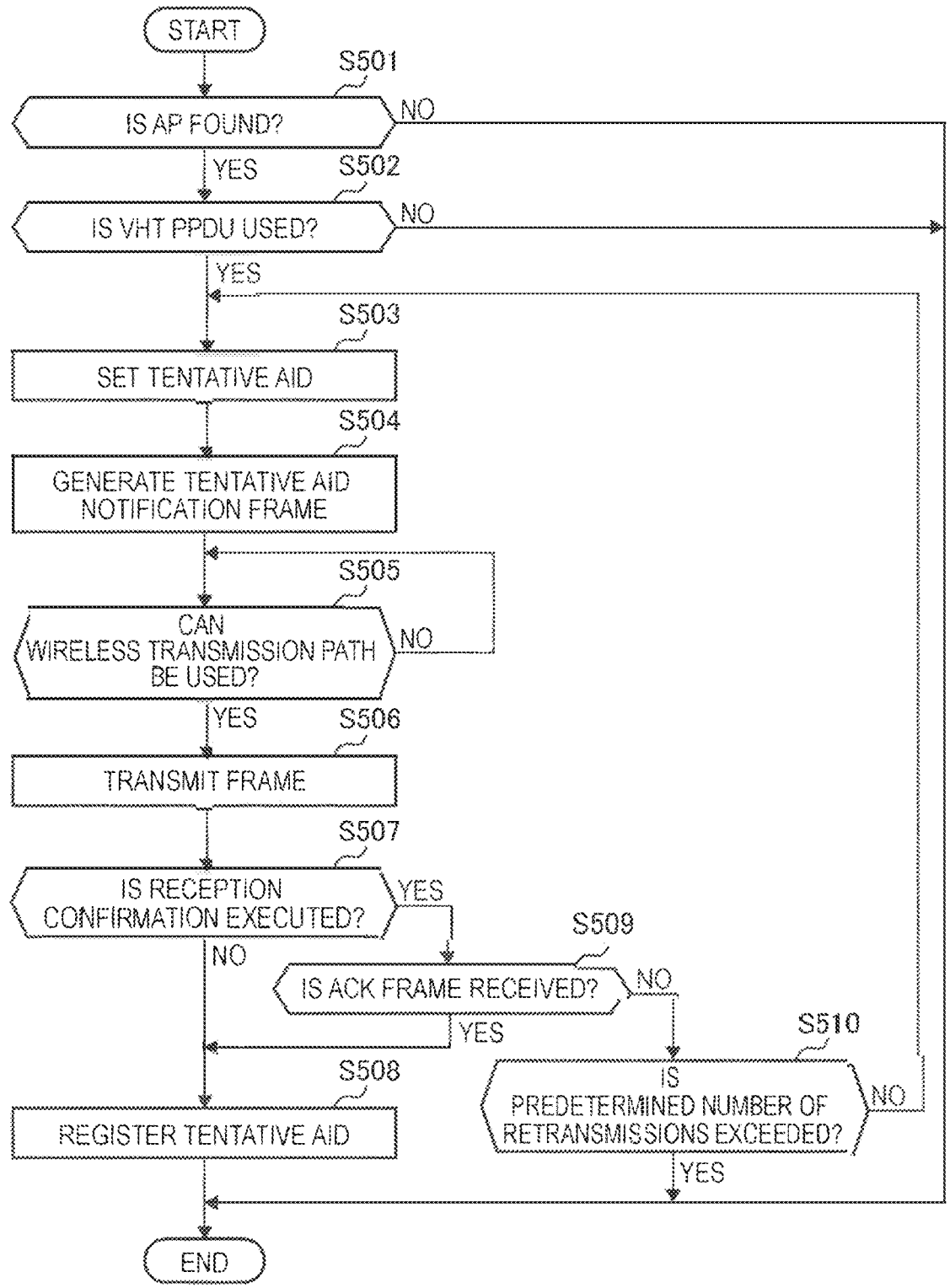
FIG. 14 is a flowchart conceptually illustrating a tentative AID registration process in an STA according to the embodiment.

Next, the tentative AID registration process in the STA 100-1 according to the embodiment will be described with reference to FIG. 14. FIG. 14 is a flowchart conceptually illustrating the tentative AID registration process in the STA 100-1 according to the embodiment.

The STA 100-1 determines whether the AP 200-1 is found (step S501). Specifically, the control unit 120 determines whether the AP 200-1 is found on the basis of, for example, whether the beacon frame is received.

When the AP 200-1 is found, the STA 100-1 determines whether the VHT PPDU can be used (step S502). Specifically, when the AP 200-1 is found, the control unit 120 determines whether the VHT PPDU can be used in communication with the AP 200-1.

When it is determined that the VHT PPDU can be used, the STA 100-1 sets the tentative AID (step S503). Specifically, when the control unit 120 determines that the VHT PPDU can be used, the control unit 120 decides the tentative AID unallocated to another STA 100-1 or the tentative AID unset by another STA 100-1 as the tentative AID of the self-device.

Subsequently, the STA 100-1 generates the tentative AID notification frame (step S504). Specifically, the control unit 120 causes the data processing unit 110 to generate the tentative AID notification frame including the information indicating the decided tentative AID.

Subsequently, the STA 100-1 determines whether a wireless delivery path can be used (step S505). Specifically, the wireless communication unit 130 determines whether the wireless delivery path is vacant by using carrier sensing or the like.

When it is determined that the wireless delivery path can be used, the STA 100-1 transmits the generated frame to the AP 200-1 (step S506). Specifically, when it is determined that the wireless delivery path is the vacant, the wireless communication unit 130 transmits the generated tentative AID notification frame to the AP 200-1.

Subsequently, the STA 100-1 determines whether reception confirmation by the ACK frame can be executed (step S507). Specifically, the control unit 120 determines whether the reception confirmation by the ACK frame to the transmitted tentative AID notification frame is executed.

When it is determined that the reception confirmation by the ACK frame is not executed, the STA 100-1 registers the tentative AID (step S508). Specifically, when it is determined that the reception confirmation by the ACK frame to the tentative AID notification frame is note executed, the control unit 120 causes the storage unit to store the tentative AID of which the AP 200-1 is notified using the tentative AID notification frame in association with the AP 200-1.

In addition, in a case in which it is determined in step S507 that the reception confirmation by the ACK frame is executed, the STA 100-1 determines whether the ACK frame is received (step S509). Specifically, when it is determined that the reception confirmation by the ACK frame to the tentative AID notification frame is executed, the control unit 120 waits for a predetermined time from the transmission of the tentative AID notification frame to the reception of the ACK frame. Moreover, when the ACK frame is received, the process proceeds to step S508.

When it is determined that the ACK frame is not received, the STA 100-1 determines whether the number of retransmissions of the tentative AID notification frame exceeds a predetermined number of times (step S510). Specifically, when it is determined that the ACK frame is not received until the predetermined time has passed from the transmission of the tentative AID notification frame, the control unit 120 determines whether the number of retransmission of the tentative AID notification frame exceeds a predetermined number of times.

When it is determined that the number of retransmissions of the tentative AID notification frame exceeds the predetermined number of times, the process ends. Otherwise, the process returns to step S503 and the tentative AID may be reset.

(Flow of Tentative AID Registration Process in AP)

Figure 15:
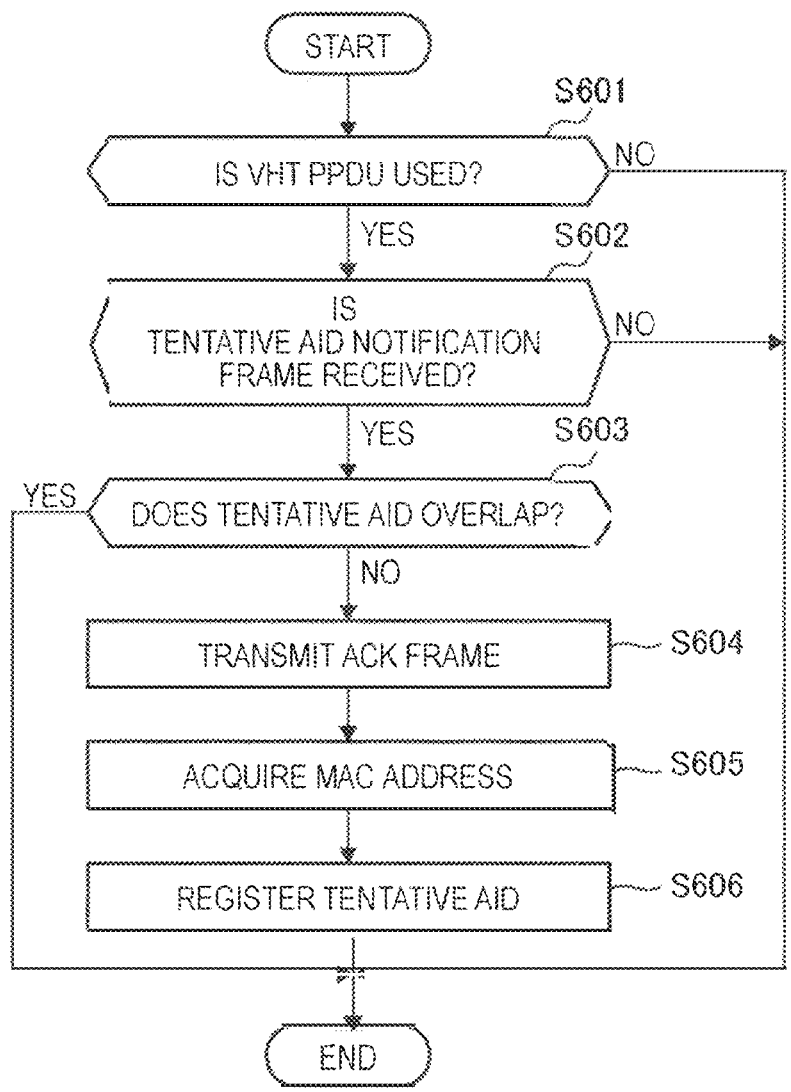
FIG. 15 is a flowchart conceptually illustrating a tentative AID registration process in an AP according to the embodiment.

Next, the tentative AID registration process in the AP 200-1 according to the embodiment will be described with reference to FIG. 15. FIG. 15 is a flowchart conceptually illustrating the tentative AID registration process in the AP 200-1 according to the embodiment.

The AP 200-1 determines whether the VHT PPDU can be used (step S601). Specifically, the control unit 220 determines whether the VHT PPDU can be used in communication with the STA 100-1.

When it is determined that the VHT PPDU can be used, the AP 200-1 waits for the tentative notification frame (step S602). Specifically, the wireless communication unit 230 waits for the frame in a state in which the tentative AID notification frame can be received.

When the tentative AID notification frame is received, the AP 200-1 determines whether the tentative AID overlaps (step S603). Specifically, when the tentative AID notification frame is received, the control unit 220 determines whether the tentative AID indicated by the information included in the tentative AID notification frame overlaps with the tentative AID already registered in regard to another STA 100-1.

When it is determined that the tentative AID does not overlap, the AP 200-1 transmits the ACK frame to the STA 100-1 (step S604). Specifically, when it is determined that the tentative AID does not overlap with the tentative AIDs of the other STAs 100-1, the control unit 220 causes the data processing unit 210 to generate the ACK frame to the tentative AID notification frame. Then, the wireless communication unit 230 transmits the generated ACK frame to the STA 100-1.

Subsequently, the AP 200-1 acquires the MAC address (step S605). Specifically, the data processing unit 210 acquires the MAC address of the STA 100-1 which is a transmission source of the frame from the received tentative AID notification frame.

Subsequently, the AP 200-1 registers the tentative AID (step S606). Specifically, the control unit 220 causes the storage unit to store the tentative AID in association with the STA 100-1, that is, the MAC address.

(Flow of Transmission and Reception Processes Using Tentative AID in STA)

Figure 16:
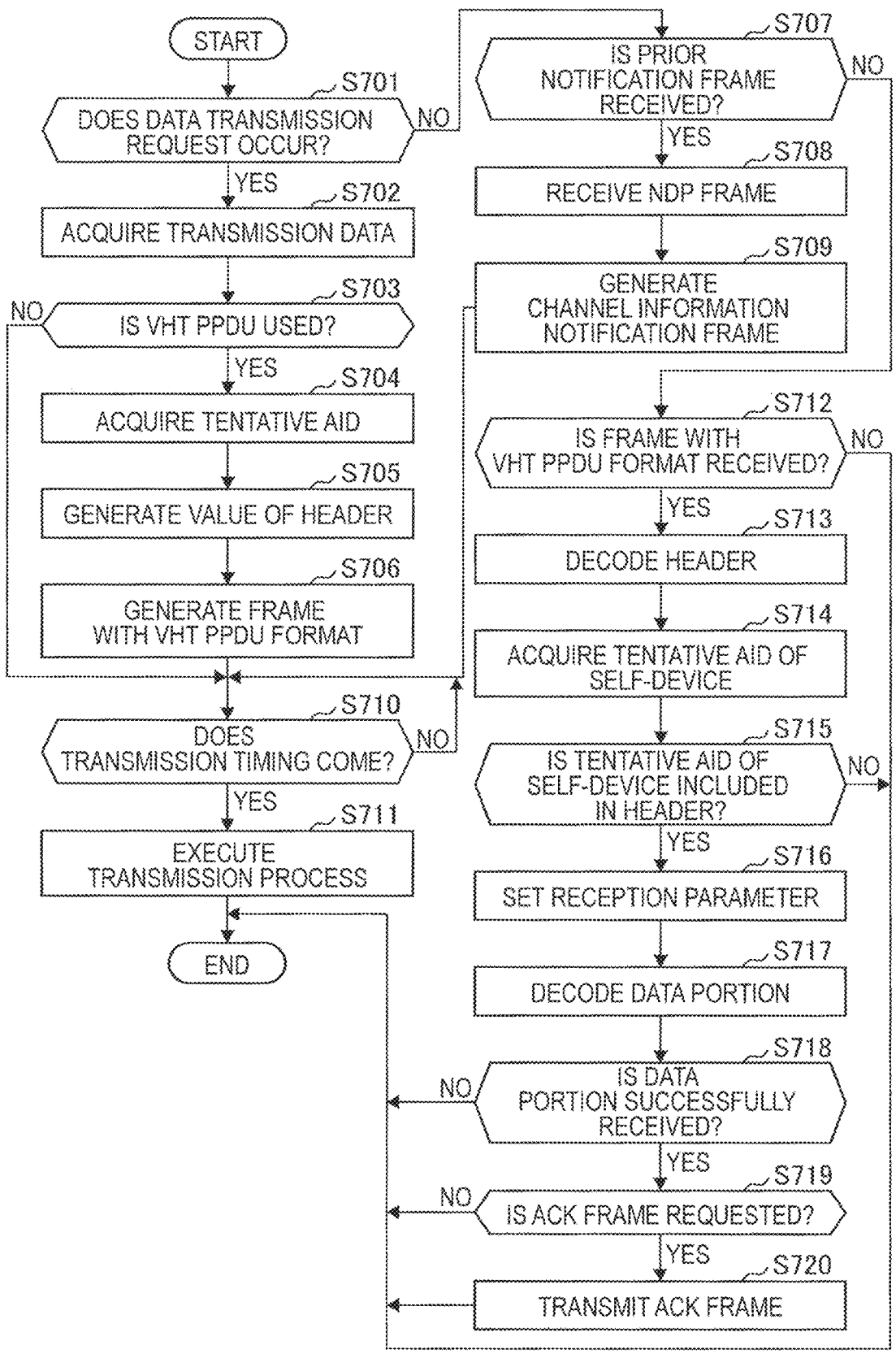
FIG. 16 is a flowchart conceptually illustrating transmission and reception processes using the tentative AID in an STA according to the embodiment.

Next, transmission and reception processes using the tentative AID in the STA 100-1 according to the embodiment will be described with reference to FIG. 16. FIG. 16 is a flowchart conceptually illustrating the transmission and reception processes using the tentative AID in an STA 100-1 according to the embodiment. Moreover, the description of substantially the same process as the above-described process will be omitted.

The STA 100-1 determines whether a data transmission request occurs (step S701). Specifically, when the data transmission request to the AP 200-1 occurs, the control unit 120 determines whether the AP 200-1 is in a state in which the tentative AID is registered.

When the data transmission request occurs, the STA 100-1 acquires the delivery data (step S702). Specifically, when it is determined that the tentative AID in regard to the AP 200-1 of a data transmission request destination is registered, the control unit 120 acquires data desired to be delivered.

Subsequently, the STA 100-1 determines whether the VHT PPDU can be used (step S703). When it is determined that the VHT PPDU can be used, the tentative AID is acquired (step S704). Specifically, in a case in which the VHT PPDU can be used, the control unit 120 acquires the tentative AID of the self-device in regard to the AP 200-1.

Subsequently, the STA 100-1 generates a value of the header of the VHT PPDU (step S705). Specifically, the control unit 120 generates the value stored in the VHT SIG on the basis of the acquired tentative AID.

Subsequently, the STA 100-1 generates a frame with the VHT PPDU format (step S706). Specifically, the data processing unit 110 generates a data frame including the acquired delivery data. Then, the wireless communication unit 130 generates a frame with the VHT PPDU format on the basis of the value stored in the VHT SIG and the generated data frame. Moreover, in a case in which it is determined in step S703 that the VHT PPDU is not used, a frame with a normal PPDU format may be generated.

Conversely, when it is determined in step S701 that the data transmission request does not occur, the STA 100-1 determines whether the prior notification frame is received (step S707). Specifically, when the VHT NDP Announcement frame is received, the control unit 120 determines whether the tentative AID of the self-device is included in the information indicating the tentative AID of the frame.

When it is determined that the prior notification frame is received, the STA 100-1 receives the NDP frame transmitted after the prior notification frame (step S708). Specifically, when the VHT NDP Announcement frame destined for the self-device is received, the wireless communication unit 130 waits for the NDP frame.

When the NDP frame is received, the STA 100-1 generates the channel information notification frame on the basis of the reception of the NDP frame (step S709). Specifically, when the NDP frame is received, the wireless communication unit 130 generates the channel information on the basis of the reception of the NDP frame. Then, the control unit 120 causes the data processing unit 110 to generate the VCB frame including the channel information generated on the basis of the reception of the NDP frame. Moreover, in a case in which the BRP frame destined for the self-device is received, the control unit 120 may cause the data processing unit 110 to generate the VCB frame.

Subsequently, the STA 100-1 waits until a transmission timing comes (step S710). Specifically, the wireless communication unit 130 waits for the transmission of the frame until the transmission timing of the VCB frame or the generated frame with the VHT PPDU format comes. Here, the transmission timing of the VCB frame differs between a case in which the VCB frame is transmitted as a response to the NDP frame and a case in which the VCB frame is transmitted as a response to the BRP frame.

When the transmission timing comes, the STA 100-1 executes a transmission process (step S711). Specifically, when the transmission timing comes, the wireless communication unit 130 transmits the VCB frame or the frame with the VHT PPDU format.

Conversely, when it is determined in step S707 that the prior notification frame is not received, the STA 100-1 determines whether the frame with the VHT PPDU format is received (step S712). Specifically, the wireless communication unit 130 waits in a state in which the frame with the VHT PPDU format can be received.

When it is determined that the frame with the VHT PPDU format is received, the STA 100-1 decodes the header of the frame (step S713). Specifically, when the VHT PPDU is received, the wireless communication unit 130 decodes the VHT SIG of the frame with the VHT PPDU format.

Subsequently, the STA 100-1 acquires the tentative AID of the self-device (step S714). Specifically, the wireless communication unit 130 acquires the tentative AID of the self-device from the storage unit.

Subsequently, the STA 100-1 determines whether the tentative AID of the self-device is included in the header (step S715). Specifically, the wireless communication unit 130 determines whether the acquired tentative AID is included in the decoded VHT SIG. Moreover, information generated from the tentative AID may be used instead of the tentative AID.

When it is determined that the tentative AID of the self-device is included in the header, the STA 100-1 sets a reception parameter (step S716). Specifically, when it is determined that the tentative AID of the self-device is included in the header, the wireless communication unit 130 sets the reception parameter of the self-device on the basis of information used to receive a portion subsequent to the header and included in the header.

Subsequently, the STA 100-1 decodes the data portion (step S717). Specifically, the wireless communication unit 130 decodes the data portion located after the header.

Subsequently, the STA 100-1 determines whether the data portion is successfully received (step S718). Specifically, the data processing unit 110 determines whether the data portion is successfully received.

When it is determined that the frame is successfully received, the STA 100-1 determines whether the ACK frame is requested (step S719). When it is determined that the ACK frame is requested, the ACK frame is transmitted to the AP 200-1 (step S720).

(Flow of Transmission and Reception Processes Using Tentative AID in AP)

Figure 17:
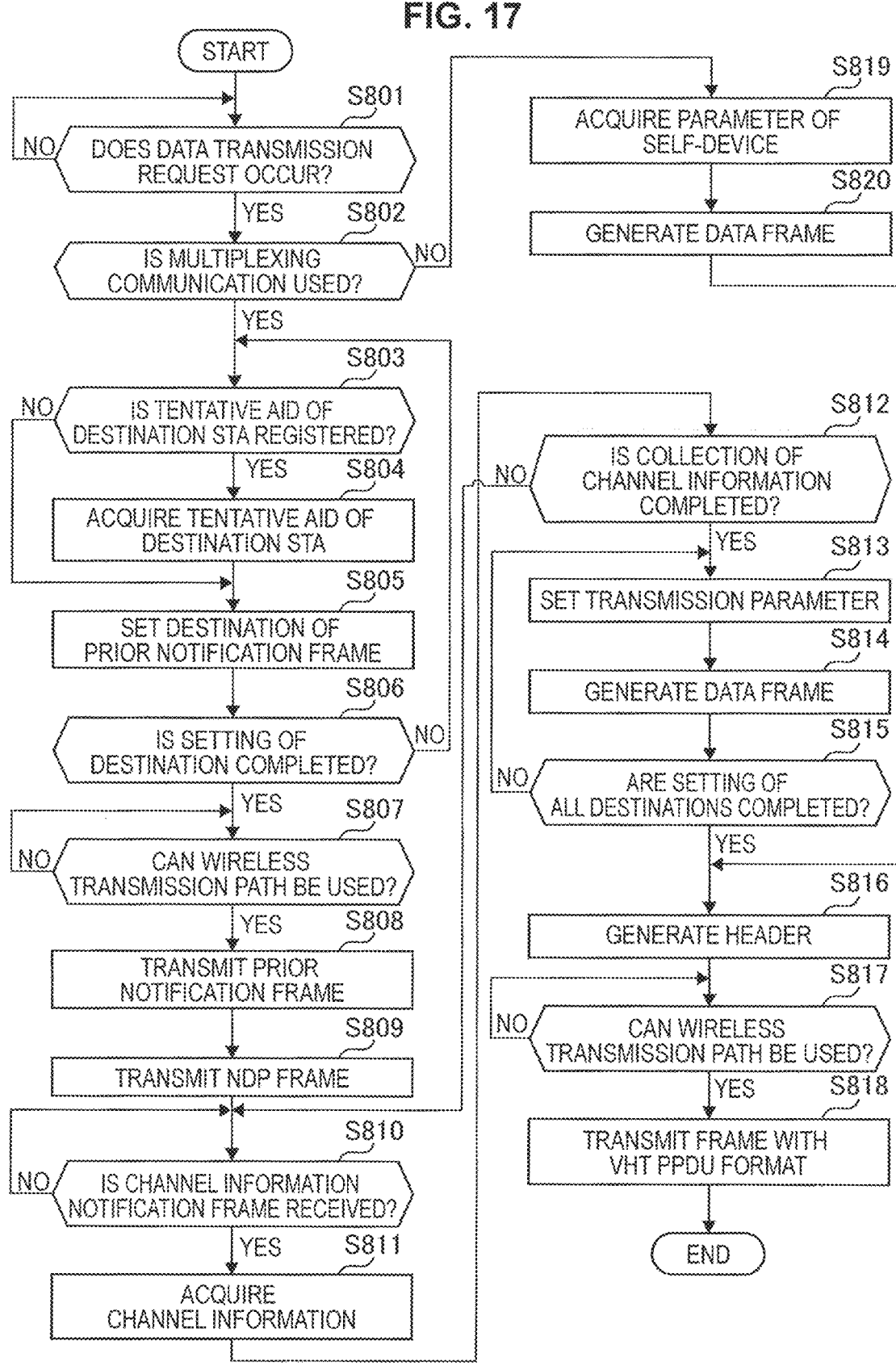
FIG. 17 is a flowchart conceptually illustrating transmission and reception processes using the tentative AID in an AP according to the embodiment.

Next, transmission and reception processes using the tentative AID in the AP 200-1 according to the embodiment will be described with reference to FIG. 17. FIG. 17 is a flowchart conceptually illustrating the transmission and reception processes using the tentative AID in the AP 200-1 according to the embodiment. Moreover, the description of substantially the same process as the above-described process will be omitted.

The AP 200-1 determines whether a data transmission request occurs (step S801). Specifically, the control unit 220 determines whether there is data desired to be delivered. For example, the control unit 220 determines that there is the data in a transmission buffer.

When it is determined that the data transmission request occurs, the AP 200-1 determines whether multiplexing communication is used (step S802). Specifically, when it is determined that there is the data desired to be delivered, the control unit 220 determines whether the multiplexing communication is used to deliver the data in a case in which there are the plurality of pieces of data.

When it is determined that the multiplexing communication is used, the AP 200-1 determines whether the tentative AID of the STA 100-1 which is a destination is registered (step S803). Specifically, when it is determined that the multiplexing communication is used to deliver the data, the control unit 220 determines whether the tentative AID of the STA 100-1 which is a delivery destination of the data is registered.

When it is determined that the tentative AID of the STA 100-1 which is the destination is registered, the AP 200-1 acquires the tentative AID of the STA 100-1 (step S804). Specifically, when it is determined that the tentative AID of the STA 100-1 which is the delivery destination of the data is registered, the control unit 220 acquires the tentative AID from the storage unit.

Subsequently, the AP 200-1 sets a destination of the prior notification frame (step S805). Specifically, the control unit 220 sets the acquired tentative AID as destination information of the VHT NDP Announcement frame. Then, the data processing unit 210 stores information indicating the set tentative AID in a field of the destination information.

Then, the AP 200-1 repeats the processes of the foregoing steps S803 to S805 until the setting of the destination is completed in all the STAs 100-1 which are destinations (step S806).

When the setting of the destination is completed in all the STAs 100-1 which are destinations, the AP 200-1 determines whether the wireless delivery path can be used (step S807). When it is determined that the wireless delivery path can be used, the prior notification frame is transmitted (step S808). Specifically, when it is determined that the wireless delivery path is vacant, the wireless communication unit 230 transmits the generated VHT NDP Announcement frame to the STA 100-1.

Subsequently, the AP 200-1 transmits the NDP frame (step S809). Specifically, the wireless communication unit 230 transmits the NDP frame to the STA 100-1 after a predetermined time has passed from the transmission of the VHT NDP Announcement frame.

Subsequently, the AP 200-1 determines whether the channel information notification frame is received (step S810). Specifically, the wireless communication unit 230 waits in a receivable state until the VCB frame is received after the reception of the NDP frame.

When the channel information notification frame is received, the AP 200-1 acquires the channel information (step S811). Specifically, when the VCB frame is received, the data processing unit 210 acquires the channel information from the VCB frame.

Subsequently, the AP 200-1 determines whether collection of the channel information is completed (step S812). Specifically, the control unit 220 determines whether the VCB frames are successfully received from all the STAs 100-1 which are the destination of the VHT NDP Announcement frame. Moreover, the STA 100-1 having not received the VCB frame may be requested to transmit the VCB frame by transmission of the BRP frame.

When it is determined that the collection of the channel information is completed, the AP 200-1 sets a transmission parameter (step S813). Specifically, when it is determined that the VCB frames are received from all the STAs 100-1, the control unit 220 causes the wireless communication unit 230 to set the transmission parameter for multiplexing communication on the basis of the channel information acquired via the VCB frame.

Subsequently, the AP 200-1 generates a data frame (step S814). Specifically, the control unit 220 causes the data processing unit 110 to generate the data frame destined for the STA 100-1.

The AP 200-1 repeats the processes of the foregoing steps S813 and S814 until the setting of all the destinations is completed (step S815).

When the setting of all the destinations is completed, the AP 200-1 generates a header (step S816). Specifically, the wireless communication unit 230 generates the VHT SIG including the tentative AID as destination information. Moreover, in a case in which multiplexing communication is used, the wireless communication unit 230 generates a multiple-user VHT SIG. In a case in which no multiplexing communication is used, the wireless communication unit 230 generates a single user VHT SIG.

Subsequently, the AP 200-1 determines whether the wireless delivery path can be used (step S817). When it is determined that the wireless delivery path can be used, the frame with the VHT PPDU format is transmitted (step S818). Specifically, when it is determined that the wireless delivery path is vacant, the wireless communication unit 230 transmits the frame with the VHT PPDU format including the generated frame and the VHT SIG to the STA 100-1.

Moreover, when it is determined in step S802 that no multiplexing communication is used, the AP 200-1 acquires the parameter of the self-device (step S819). Specifically, the control unit 220 acquires the parameter of the self-device used to construct the frame and the frame with the VHT PPDU format.

Subsequently, the AP 200-1 generates the data frame (step S820). Specifically, the control unit 220 causes the data processing unit 210 to generate the data frame on the basis of the acquired parameter. Then, the process proceeds to step S816 and the frame with the VHT PPDU format including the data frame is transmitted.

<2-5. Conclusion of First Embodiment>

In this way, according to the first embodiment of the present disclosure, the STA 100-1 transmits the first frame including the second association identifier decided by a communication device to which a first association identifier is allocated and receives the second frame including information related to the second association identifier. In addition, the AP 200-1 receives the first frame including the second association identifier generated by a communication device to which the first association identifier is allocated and transmits the second frame including the information related to the second association identifier. Therefore, by using the tentative AID in communication between the STA 100-1 and the AP 200-1, it is possible to improve communication efficiency in communication before the AID is allocated. For example, by using the tentative AID instead of the MAC address, it is possible to reduce the size of the header without executing the association process. In addition, by omitting the association process, it is possible to reduce an overhead of communication with the AP 200-1.

In addition, the second association identifier is decided within a setting range of the second association identifier. Therefore, by selecting the tentative AID within the range of a pre-decided value, it is possible to execute management of the tentative AID and a process using the tentative AID more efficiently than in a case in which the tentative AID is decided under no rule in the STA 100-1.

In addition, the setting range of the second association identifier includes a setting range different from the setting range of the first association identifier. Therefore, by ensuring the tentative AID separately from the AID, it is possible to operate the tentative AID without having an influence on the AID. Further, in a case in which the number of STAs 100-1 desiring connection (association) with the AP 200-1 is greater than the number of ensured AIDs, it is difficult for some of the STAs 100-1 to be connected to the AP 200-1. In this case, in the related art, an improvement in the situation is achieved in many cases by increasing the number of APs 200-1. However, in the configuration, even in a case in which the AIDs are depleted, the STAs 100-1 can be connected to the AP 200-1 without increasing the number of APs 200-1. Accordingly, it is possible to increase communication opportunities of the STAs 100-1.

In addition, on the other hand, the setting range of the second association identifier may also include the setting range of the first association identifier. In this case, it is possible to execute communication using the tentative AID without newly ensuring the setting range of the tentative AID.

In addition, the STA 100-1 decides the second association identifier different from the second association identifier used in another communication device. Therefore, by selecting the tentative AID not overlapping with the tentative AIDs of the other STAs 100-1 in advance, it is possible to suppress unnecessary occurrence of communication due to the overlapping of the tentative AID. For example, it is possible to prevent notification of the tentative AID from being executed again due to the overlapping of the tentative AID from being found in the AP 200-1. Accordingly, it is possible to suppress deterioration in communication efficiency of the tentative AID registration process.

In addition, information related to the second association identifier includes information indicating the second association identifier. Therefore, it is possible to ascertain the tentative AID without executing a special process. In addition, the information related to the second association identifier may also include information decided on the basis of the second association identifier. In this case, it is possible to ascertain the tentative AID with information less than the tentative AID. Accordingly, in a case in which the tentative AID is included as destination information in the header, it is possible to further reduce the size of the header.

In addition, the second frame includes a frame related to a channel information request. Therefore, it is possible to improve efficiency of communication related to the sounding process of collecting the channel information.

In addition, the frame related to the channel information request includes a frame for issuing a notification of transmission of a channel request frame. Therefore, the prior notification frame using the AID of the related art can be used before allocation of the AID. Accordingly, since the channel information can be collected before the allocation of the AID, the channel information can be used for multiplexing communication or the like. As a result, it is possible to improve communication efficiency. Moreover, the second frame may include the channel information request frame. For example, the tentative AID may be used instead of the reception address of the BRP frame. In this case, by shortening the size of the frame than the size of the BRP frame of the related art, it is possible to improve communication efficiency of the BRP frame.

In addition, the first frame includes a frame including the second association identifier as transmission source information of the frame. Therefore, by using the tentative AID instead of a transmission source address, it is possible to reduce the size of the frame. Accordingly, it is possible to improve communication efficiency in communication of the frame.

In addition, the second frame includes a frame including the second association identifier as destination information of the frame. Therefore, by using the tentative AID instead of a destination address, it is possible to reduce the size of the frame. Accordingly, it is possible to improve communication efficiency in communication of the frame.

In addition, the STA 100-1 transmits the first frame including the second association identifier different from the second association identifier included in the first frame for which a confirmation response frame has not been received. Therefore, in a case in which the tentative AID of which the AP 200-1 is notified using the tentative AID notification frame is not registered in the AP 200-1 because of overlapping of the tentative AID or the like, it is possible to prevent the tentative AID from remaining unregistered by transmitting the tentative AID notification frame including a tentative AID different from the tentative AID. Accordingly, it is possible to improve reliability of the registration of the tentative AID.

In addition, the AP 200-1 transmits a confirmation response frame for the first frame on the basis of whether the second association identifier is usable. Therefore, by presenting the usability of the tentative AID to the STA 100-1 in accordance with whether the confirmation response frame is transmitted, it is possible to suppress an operation related to unnecessary communication of the STA 100-1. For example, it is possible to suppress retransmission of the tentative AID notification frame despite failure of reception of the tentative AID notification frame, waiting of communication using the tentative AID by registering the tentative AID, and the like. Accordingly, it is possible to suppress an increase in a communication amount or a communication overhead.

In addition, whether the second association identifier is usable is determined on the basis of whether the second association identifier overlaps between communication devices transmitting the first frame. Therefore, by preventing the overlapping of the tentative AID, it is possible to prevent occurrence of disorder of the communication in which the tentative AID is used.

In addition, the second frame is transmitted to a plurality of communication devices at one time. Therefore, it is possible to further improve communication efficiency, compared to a case in which, for example, the frame with the VHT PPDU format is individually transmitted to the plurality of STAs 100-1.

In addition, the second frame is multiplexed. Therefore, it is possible to improve use efficiency of communication resources such as a time, a frequency, a space, or the like. Accordingly, it is possible to improve communication efficiency of the communication in which the tentative AID is used.

3. Second Embodiment (Association Process Using Tentative AID)

The communication device 100-1 (200-1) according to the first embodiment of the present disclosure has been described above. Next, a communication device 100-2 (200-2) according to a second embodiment of the present disclosure will be described. A communication system according to the embodiment performs an association process using a tentative AID. Moreover, the basic configuration of the communication device 100-2 (200-2) according to the embodiment is substantially the same as the configuration according to the first embodiment, and therefore the description thereof will be omitted.

<3-1. Functional Details of Communication Device>

First, the functional details of the communication device 100-2 (200-2) according to the embodiment of the present disclosure will be described.

(A. Functional Details of STA)

First, the functional details of the STA 100-2 will be described.

(A-5. Association Request Process)

The STA 100-2 transmits the association request frame including the tentative AID as the first frame. Specifically, the control unit 120 decides the tentative AID in a case in which connection with the AP 200-2 is established. Subsequently, the control unit 120 causes the data processing unit 110 to generate an association request frame including the decided tentative AID. Then, the wireless communication unit 130 transmits the generated association request frame to the AP 200-2. Moreover, the tentative AID can be obtained as the 24th information component of the association request frame defined in the IEEE 802.11 standard.

(A-6. Association Response Process)

The STA 100-2 receives the association response frame including information related to the tentative AID as the second frame. Specifically, when the association response frame for the association request frame is received, the STA 100-2 determines whether the association response frame is an association response frame destined for the self-device on the basis of the information related to the tentative AID included in the association response frame. In a case in which it is determined that the association response frame is the association response frame destined for the self-device, the STA 100-2 registers the AID included in the association response frame as the AID of the self-device. Moreover, the association response frame is multiplexed.

For example, the wireless communication unit 130 determines whether the tentative AID of the self-device is included in the information indicating the tentative AID included in the received header. In a case in which the tentative AID of the self-device is included in the header, the wireless communication unit 130 decodes the frame and provides a frame obtained through the decoding to the data processing unit 110. Subsequently, the data processing unit 110 acquires information indicating the AID from the provided association response frame. Then, the control unit 120 registers the AID indicated by the acquired information as the AID of the self-device. Moreover, the association response frame may be a frame obtained by aggregating the plurality of association response frames.

(B. Functional Details of AP)

Next, the functional details of the AP 200-2 will be described.

(B-4. Association Request Process)

The AP 200-2 receives an association request from including the tentative AID as the first frame. Specifically, when the association request frame is received, the data processing unit 210 acquires the tentative AID included in the association request frame. Subsequently, the control unit 220 decides the AID for the STA 100-2 which is a transmission source of the association request frame. Then, the control unit 220 causes the storage unit to store the decided AID and the acquired tentative AID in association therewith.

(B-5. Association Response Process)

The AP 200-2 transmits an association response frame including the information related to the tentative AID as the second frame. Specifically, in a case in which the plurality of association request frames are received within a predetermined time, the STA 200-2 transmits the association response frames for the association request frames at one time.

For example, the control unit 220 acquires the AID decided on the basis of an association request and the tentative AID association with the AID. Subsequently, the control unit 220 causes the data processing unit 210 to generate an association response frame including the acquired AID and the tentative AID. Then, the process of generating the association response frame is repeated by the number of transmission sources of the association request frame. Subsequently, the wireless communication unit 230 executes a process of multiplexing each of the generated association response frames and the multiplexed association response frames are transmitted to the STA 100-2 which is a destination.

<3-2. Process of Communication Device>

Next, a process of the communication device 100-2 (200-2) according to the embodiment will be described.

(Overview of Association Process Using Tentative AID)

Figure 18:
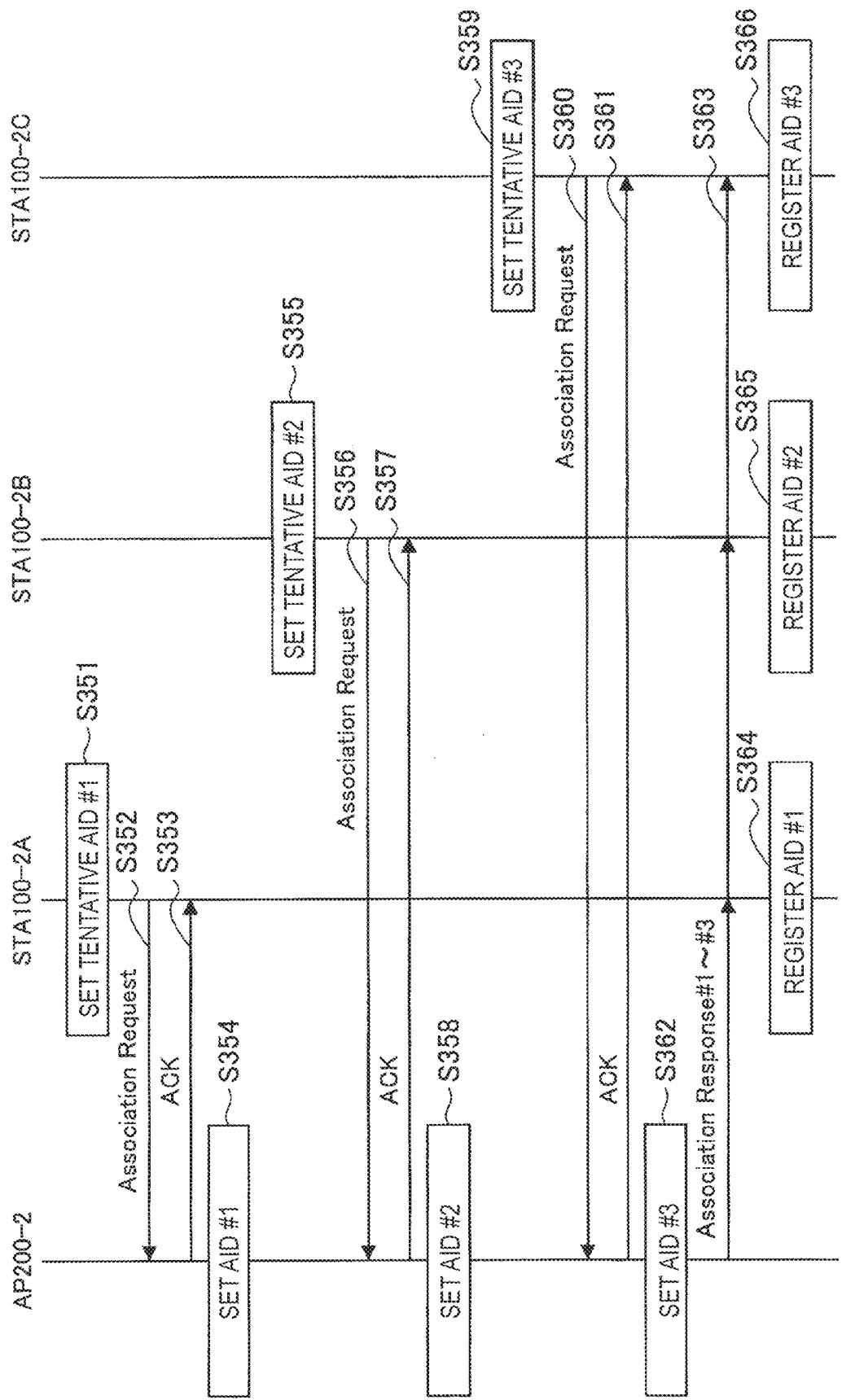
FIG. 18 is a sequence diagram conceptually illustrating an overview of an association process using a tentative AID according to a second embodiment of the present disclosure.

First, an overview of the association process using the tentative AID in the communication device 100-2 (200-2) according to the embodiment will be described with reference to FIG. 18. FIG. 18 is a sequence diagram conceptually illustrating an overview of the association process using the tentative AID according to the embodiment.

When a connection request with the AP 200-2 occurs, the STA 100-2A sets tentative ADI #1 at random (step S351).

Subsequently, the STA 100-2A transmits the association request frame including the set tentative AID #1 to the AP 200-2 (step S352).

The AP 200-2 receiving the association request frame transmits the ACK frame to the Association Request frame to the STA 100-2A (step S353). Moreover, when the ACK frame is received, the STA 100-2A registers tentative ADI #1.

Subsequently, the AP 200-2 sets AID #1 in the STA 100-2A (step S354). Moreover, the AP 200-2 registers tentative AID #1 included in the received association request frame.

Subsequently, the association request process such as the foregoing steps S351 to S354 is executed in the STAs 100-2B and 100-2C (steps S355 to S362).

Thereafter, the AP 200-2 multiplexes association response frames #1 to #3 including the set AIDs #1 to #3 and the registered tentative AIDs #1 to #3 and transmits the multiplexed frames (step S363).

The STAs 100-2A to 100-2C receiving the frames in which association response frames #1 to #3 are multiplexed register AID #1 to AID #3 allocated to the self-device included in the multiplexed frames, respectively (steps S364 to S366). Specifically, the STAs 100-2A to 100-2C decode the frames destined for the self-devices on the basis of the tentative AID of the self-devices and acquire the AIDs allocated to the self-devices.

(Flow of Association Process Using Tentative AID in STA)

Figure 19:
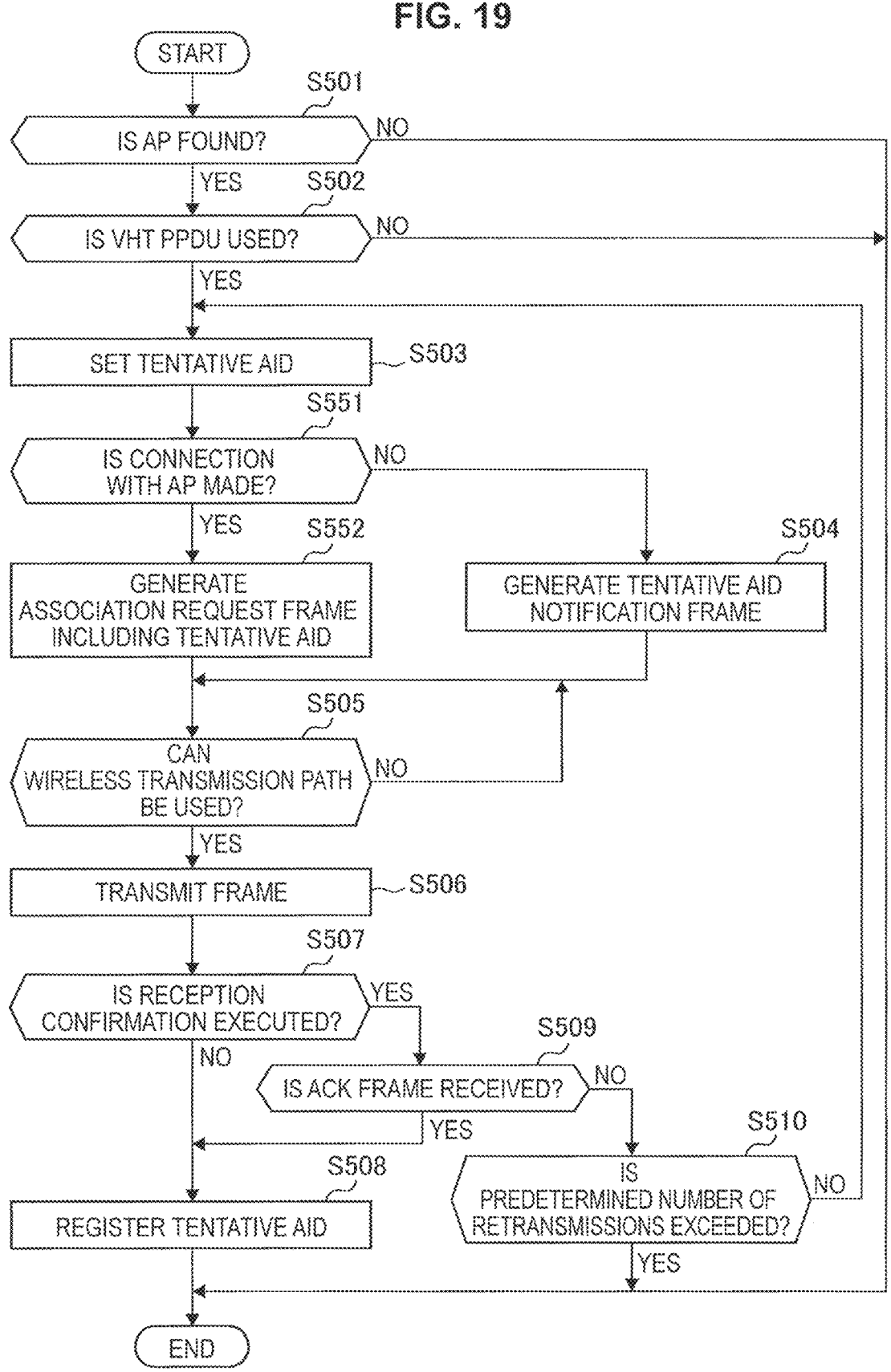
FIG. 19 is a flowchart conceptually illustrating a tentative AID registration process and an association process in an STA according to the embodiment.

Next, a flow of the association process using the tentative AID in the STA 100-2 according to the embodiment will be described with reference to FIG. 19. FIG. 19 is a flowchart conceptually illustrating a tentative AID registration process and an association process in the STA 100-2 according to the embodiment.

Processes of steps S501 to S503 are substantially the same as the processes described with reference to FIG. 14, and therefore the description thereof will be omitted.

The STA 100-2 determines whether connection with the AP 200-2 is made (step S551). Specifically, the control unit 120 determines whether the connection with the AP 200-2 is established, that is, the association process is executed.

In a case in which it is determined that the connection with the AP 200-2 is desired, the STA 100-2 generates the association request frame including the tentative AID (step S552). Specifically, when it is determined that the connection with the AP 200-2 is established, the control unit 120 causes the data processing unit 110 to generate the association request frame including the decided tentative AID. Moreover, in a case in which it is determined that the connection with the AP 200-2 is not established, the control unit 120 causes the data processing unit 110 to generate the tentative AID notification frame as in the first embodiment.

Subsequently, the process proceeds to step S505. The subsequent processes are substantially the same as the processes described with reference to FIG. 14, and therefore the description thereof will be omitted.

(Flow of Association Process Using Tentative AID in AP)

Figure 20:
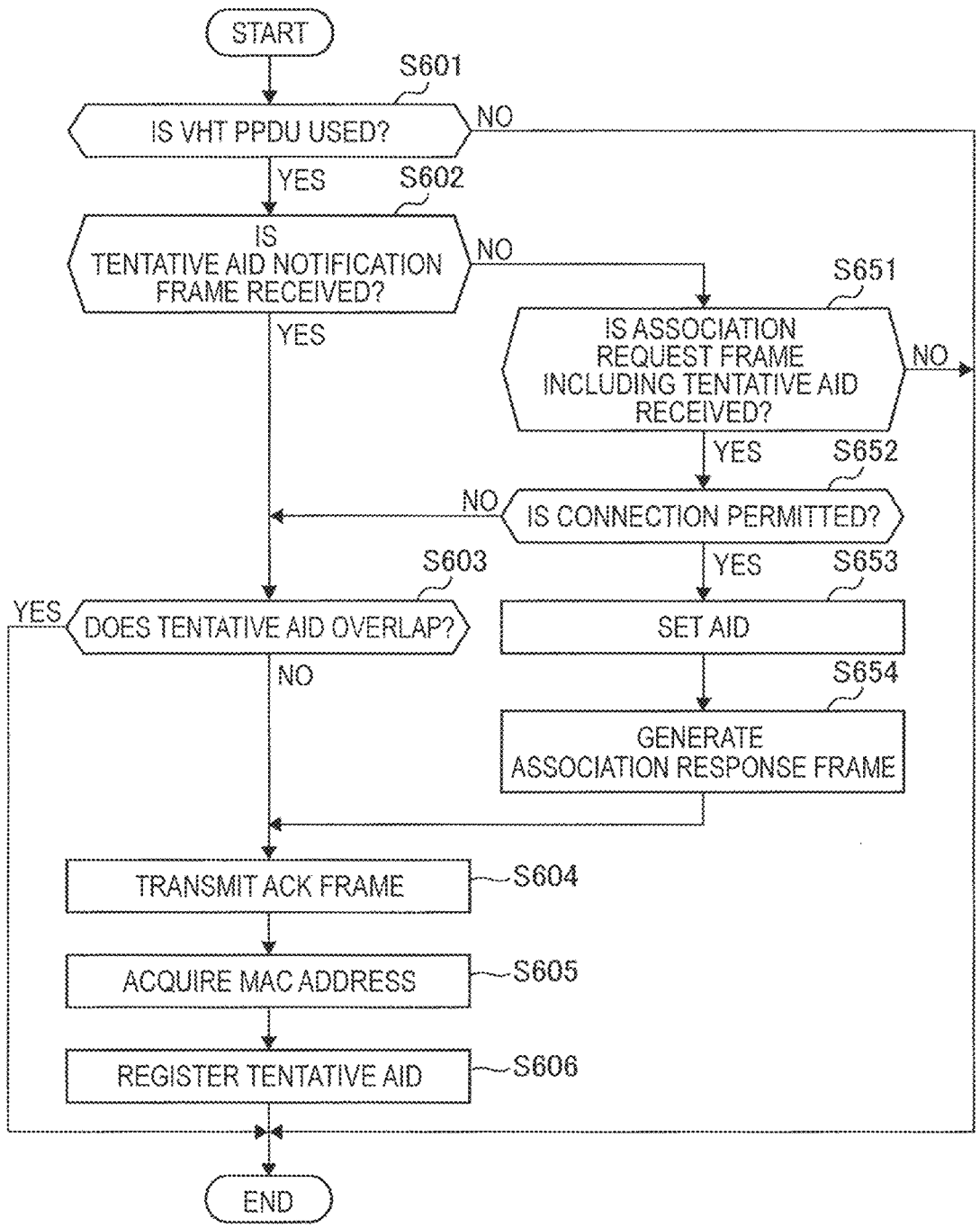
FIG. 20 is a flowchart conceptually illustrating a tentative AID registration process and an association process in an AP according to the embodiment.

Next, an association process using the tentative AID in the AP 200-2 according to the embodiment will be described with reference to FIG. 20. FIG. 20 is a flowchart conceptually illustrating a tentative AID registration process and an association process in the AP 200-2 according to the embodiment.

The processes of steps S601 to S606 are substantially the same as the processes described with reference to FIG. 15, and therefore the description thereof will be omitted.

When it is determined in step S602 that the tentative AID notification frame is not received, the AP 200-2 determines whether the association request frame including the tentative AID is received (step S651). Specifically, the data processing unit 210 determines whether the received frame is the association request frame.

When it is determined that the association request frame including the tentative AID is received, the AP 200-2 determines whether the connection is permitted to the transmission source of the frame (step S652). Specifically, the control unit 220 determines whether the connection with the STA 100-2 which is the transmission source of the association request frame is established.

In a case in which it is determined that the connection with the transmission source of the association request frame including the tentative AID is permitted, the AP 200-2 sets the AID (step S653). Specifically, when it is determined that the connection with the STA 100-2 is established, the control unit 220 sets the AID in the STA 100-2.

Subsequently, the AP 200-2 generates the association response frame (step S654). Specifically, the control unit 220 causes the data processing unit 210 to generate the association response frame including the set AID and the tentative AID. Then, the plurality of generated association response frames are multiplexed and the multiplexed frame is transmitted to the STA 100-2.

<3-3. Conclusion of Second Embodiment>

In this way, according to the second embodiment of the present disclosure, the first frame includes the association request frame and the second frame includes the association response frame for the association request frame. Therefore, for example, by using the tentative AID whose notification is issued using the association request frame in a process of demultiplexing the multiplexed frame, it is possible to multiplex the association response frame. Accordingly, communication resources related to the transmission of the association response frame are efficiently used, and thus it is possible to improve efficiency of communication related to the association process.

4. Application Examples

The technology according to the present disclosure is applicable to various products. For example, the STA 100 may be implemented as a mobile terminal such as smartphones, tablet personal computers (PCs), notebook PCs, portable game terminals, or digital cameras, a fixed-type terminal such as television receivers, printers, digital scanners, or network storages, or a car-mounted terminal such as car navigation devices. In addition, the STA 100 may be implemented as a terminal (also referred to as machine type communication (MTC) terminal) which performs machine-to-machine (M2M) communication, such as smart meters, vending machines, remote monitoring devices, or point of sale (POS) terminals. Furthermore, the STA 100 may be a wireless communication module mounted in such terminals (e.g., integrated circuit modules including one die).

On the other hand, for example, the AP 200 may be implemented as a wireless LAN access point (also referred to as a wireless base station) having or not having a router function. In addition, the AP 200 may be implemented as a mobile wireless LAN router. Furthermore, the AP 200 may be a wireless communication module (e.g., integrated circuit modules including one die) mounted on these devices.

4-1. First Application Example

Figure 21:
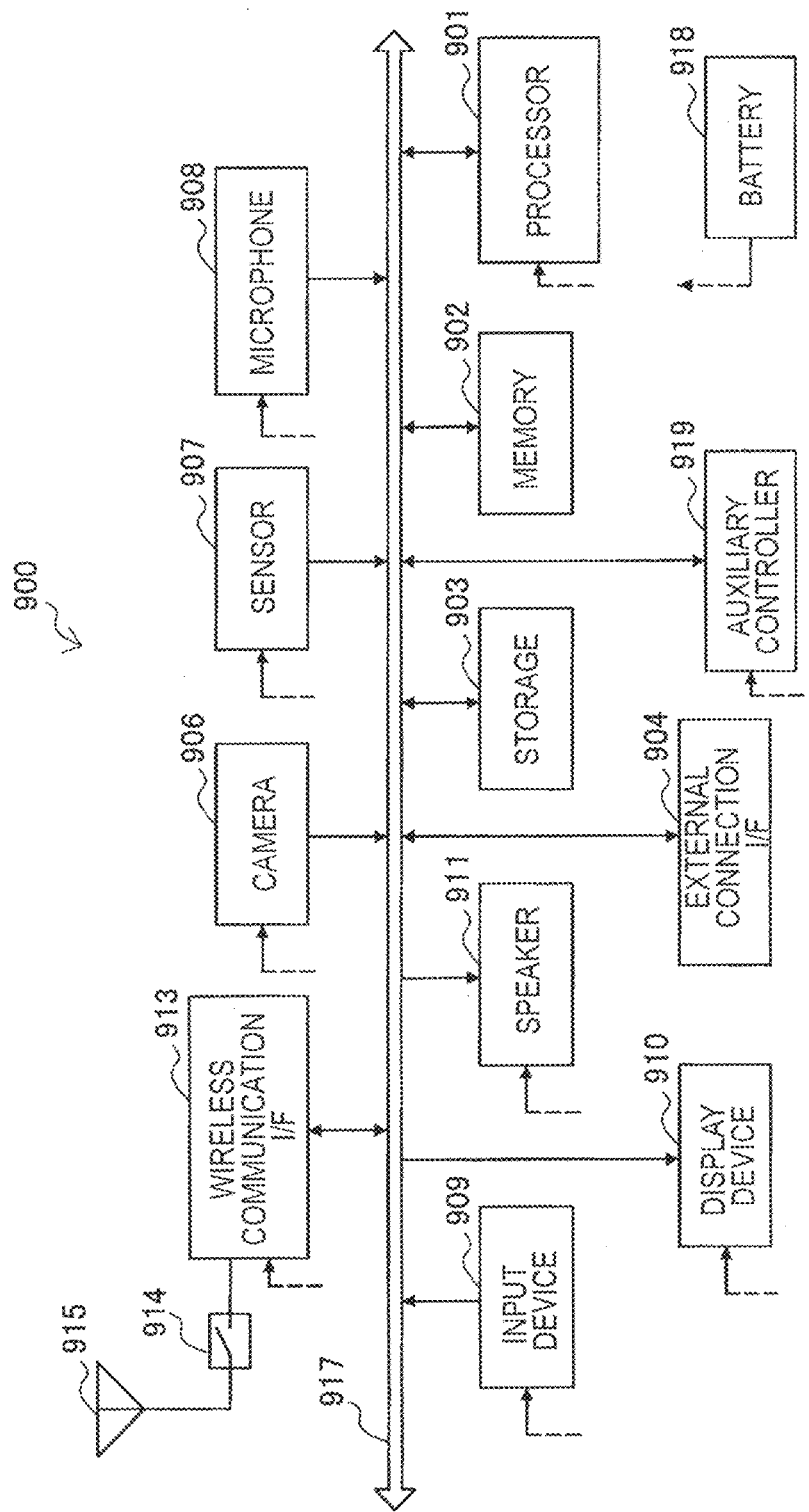
FIG. 21 is a block diagram illustrating an example of a schematic configuration of a smartphone.

FIG. 21 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The external connection interface 904 is an interface for connecting an externally attached device such as a memory card or a universal serial bus (USB) device to the smartphone 900.

The camera 906 includes, for example, an image sensor such as a charge coupled device (CCD) or a complementary metal oxide semiconductor (CMOS), and generates a captured image. The sensor 907 can include a sensor group including, for example, a positioning sensor, a gyro sensor, a geomagnetic sensor, an acceleration sensor, and the like. The microphone 908 converts voice input to the smartphone 900 into an audio signal. The input device 909 includes, for example, a touch sensor that detects touches on a screen of the display device 910, a key pad, a keyboard, buttons, switches, and the like, and accepts an operation or information input from a user. The display device 910 includes a screen such as a liquid crystal display (LCD) or an organic light emitting diode (OLED) display, and displays an output image of the smartphone 900. The speaker 911 converts an audio signal output from the smartphone 900 into voice.

The wireless communication interface 913 supports one or more of wireless LAN standards such as IEEE 802.11a, 11b, 11g, 11n, 11ac, and 11ad, and executes wireless LAN communication. The wireless communication interface 913 can communicate with other devices via a wireless LAN access point in an infrastructure mode. In addition, the wireless communication interface 913 can directly communicate with other devices in a direct communication mode such as an ad hoc mode, or Wi-Fi Direct (registered trademark). Note that, in Wi-Fi Direct mode, unlike the ad hoc mode, one of two terminals operates as an access point, but communication is performed directly between the terminals. The wireless communication interface 913 can typically include a baseband processor, a radio frequency (RF) circuit, a power amplifier, and the like. The wireless communication interface 913 may be a single-chip module on which a memory for storing a communication control program, a processor for executing the program, and a relevant circuit are integrated. The wireless communication interface 913 may support other types of wireless communication schemes such as a short-range wireless communication scheme, a close proximity wireless communication scheme, or a cellular communication scheme, in addition to the wireless LAN scheme. The antenna switch 914 switches a connection destination of the antenna 915 among a plurality of circuits (e.g., circuits for different wireless communication schemes) included in the wireless communication interface 913. The antenna 915 includes a single antenna element or a plurality of antenna elements (e.g., a plurality of antenna elements included in a MIMO antenna), and is used for transmission and reception of a wireless signal through the wireless communication interface 913.

Note that the configuration of the smartphone 900 is not limited to the example of FIG. 21, and the smartphone 900 may include a plurality of antennas (e.g., an antenna for a wireless LAN and an antenna for a close proximity wireless communication scheme). In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 illustrated in FIG. 21 via a power supply line partially indicated by dashed lines in the figure. The auxiliary controller 919 causes the required minimum functions of the smartphone 900 to operate, for example, in the sleep mode.

In the smartphone 900 illustrated in FIG. 21, the data processing unit 110, the control unit 120, and the wireless communication unit 130 described with reference to FIG. 3 may be mounted on the wireless communication interface 913. In addition, at least some of these functions may be mounted on the processor 901 or the auxiliary controller 919. For example, the control unit 120 decides the tentative AID and the frame with the VHT PPDU format in which the decided tentative AID is transmission source information is generated by the data processing unit 110. Then, the generated frame is transmitted by the wireless communication unit 130. Therefore, by using the tentative AID in the communication between the smartphone 900 and the access point, it is possible to improve efficiency of communication between the smartphone 900 and the access point.

Note that the smartphone 900 may operate as a wireless access point (software AP) by the processor 901 executing an access point function at the application level. In addition, the wireless communication interface 913 may have the wireless access point function.

4-2. Second Application Example

Figure 22:
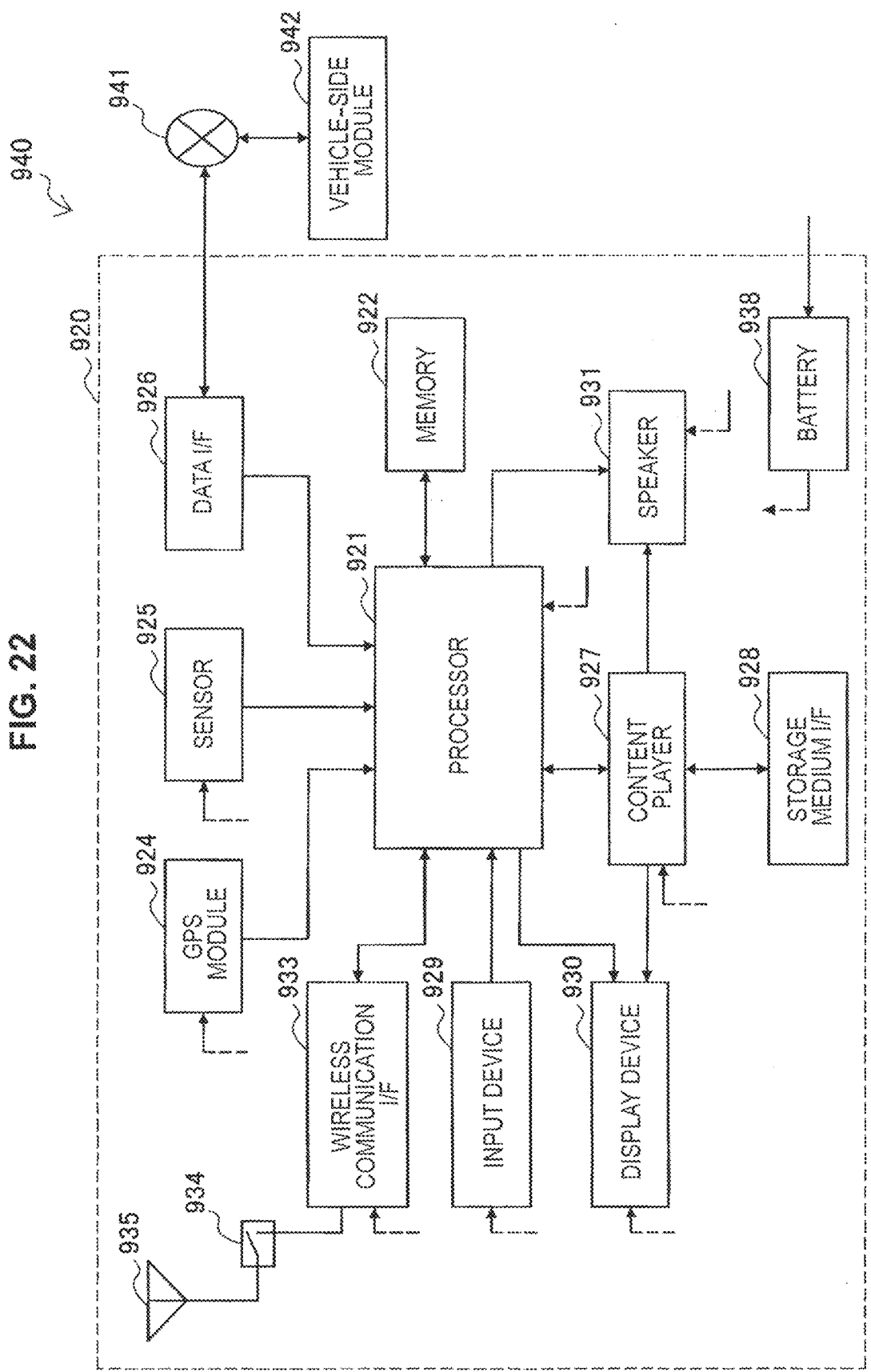
FIG. 22 is a block diagram illustrating an example of a schematic configuration of a car navigation device.

FIG. 22 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or SoC, and controls a navigation function and other functions of the car navigation device 920. The memory 922 includes a RAM and a ROM, and stores programs executed by the processor 921 and data.

The GPS module 924 measures the position (e.g., latitude, longitude, and altitude) of the car navigation device 920 using GPS signals received from a GPS satellite. The sensor 925 can include a sensor group including, for example, a gyro sensor, a geomagnetic sensor, and a barometric sensor. The data interface 926 is connected to, for example, an in-vehicle network 941 via a terminal that is not illustrated, and acquires data generated on the vehicle side such as car speed data.

The content player 927 reproduces the content stored in a storage medium (e.g., CD or DVD) inserted into the storage medium interface 928. The input device 929 includes, for example, a touch sensor that detects touches on a screen of the display device 930, buttons, switches, and the like, and accepts an operation or information input from the user. The display device 930 includes a screen such as an LCD or an OLED display, and displays a navigation function or an image of content to be reproduced. The speaker 931 outputs sound of the navigation function or the content to be reproduced.

The wireless communication interface 933 supports one or more of wireless LAN standards such as IEEE 802.11a, 11b, 11g, 11n, 11ac, and 11ad, and executes wireless LAN communication. The wireless communication interface 933 can communicate with other devices via a wireless LAN access point in an infrastructure mode. In addition, the wireless communication interface 933 can directly communicate with other devices in a direct communication mode, such as an ad hoc mode and Wi-Fi Direct. The wireless communication interface 933 can typically include a baseband processor, an RF circuit, a power amplifier, and the like. The wireless communication interface 933 may be a single-chip module on which a memory for storing a communication control program, a processor for executing the program, and a relevant circuit are integrated. The wireless communication interface 933 may support other types of wireless communication schemes such as a short-range wireless communication scheme, a close proximity wireless communication scheme, or a cellular communication scheme, in addition to the wireless LAN scheme. The antenna switch 934 switches a connection destination of the antenna 935 among a plurality of circuits included in the wireless communication interface 933. The antenna 935 includes a single antenna element or a plurality of antenna elements, and is used for transmission and reception of a wireless signal through the wireless communication interface 933.

Note that the configuration of the car navigation device 920 is not limited to the example of FIG. 22, and the car navigation device 920 may include a plurality of antennas. In this case, the antenna switch 934 may be omitted from the configuration of the car navigation device 920.

The battery 938 supplies electric power to each of the blocks of the car navigation device 920 illustrated in FIG. 22 via a power supply line partially indicated by a dashed line in the figure. In addition, the battery 938 accumulates electric power supplied from the vehicle side.

In the car navigation device 920 illustrated in FIG. 22, the data processing unit 110, the control unit 120, and the wireless communication unit 130 described with reference to FIG. 3 may be mounted on the wireless communication interface 933. In addition, at least some of these functions may be mounted on the processor 921. For example, the control unit 120 decides the tentative AID and the frame with the VHT PPDU format in which the decided tentative AID is transmission source information is generated by the data processing unit 110. Then, the generated frame is transmitted by the wireless communication unit 130. Accordingly, by using the tentative AID as transmission source information in the communication between the car navigation device 920 and the access point, it is possible to improve efficiency of communication between the car navigation device 920 and the access point.

In addition, the wireless communication interface 933 may operate as the above-described AP 200 and may provide wireless connection to a terminal carried by a user getting in a vehicle. At this time, for example, the wireless communication unit 230 receives the frame including the tentative AID and the control unit 220 causes the data processing unit 210 to generate the frame with the VHT PPDU format in which the tentative AID included in the received frame is destination information. Then, the generated frame is transmitted by the wireless communication unit 230. Therefore, by using the tentative AID in the communication between the car navigation device 920 and a terminal carried by the user, it is possible to improve efficiency of communication between the navigation device 920 and the terminal.

Further, the technology according to the present disclosure may be implemented as an in-vehicle system (or vehicle) 940 including one or more blocks of the above-described car navigation device 920, the in-vehicle network 941, and a vehicle-side module 942. The vehicle-side module 942 generates vehicle-side data such as vehicle speed, engine rpm, or failure information, and outputs the generated data to the in-vehicle network 941.

4-3. Third Application Example

Figure 23:
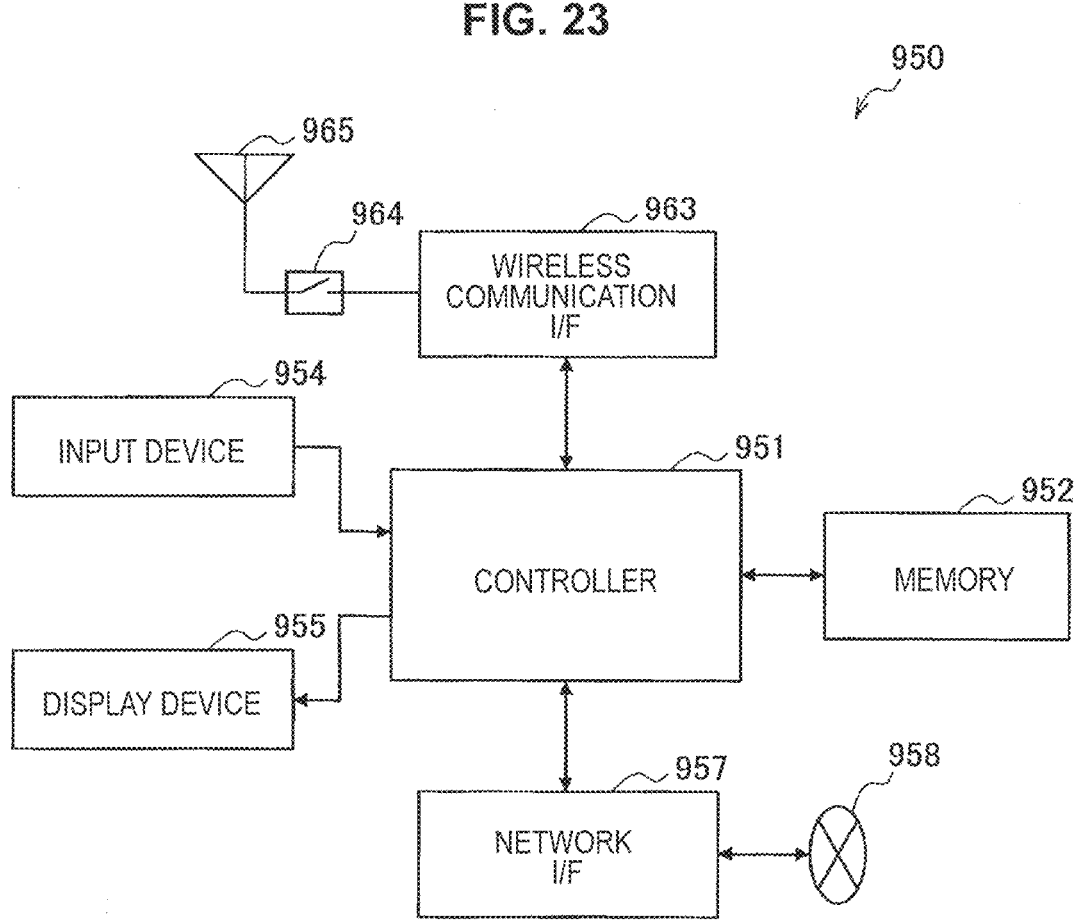
FIG. 23 is a block diagram illustrating an example of a schematic configuration of a wireless access point.

FIG. 23 is a block diagram illustrating an example of a schematic configuration of a wireless access point 950 to which the technology according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and causes various functions (e.g., access restriction, routing, encryption, firewall, log management, and the like) of the Internet Protocol (IP) layer and higher layers of the wireless access point 950 to be operated. The memory 952 includes a RAM and a ROM, and stores a program to be executed by the controller 951 and various kinds of control data (e.g., a terminal list, a routing table, an encryption key, security settings, a log, and the like).

The input device 954 includes, for example, a button, a switch, or the like and accepts an operation from a user. The display device 955 includes an LED lamp or the like, and displays operation status of the wireless access point 950.

The network interface 957 is a wired communication interface for the wireless access point 950 to connect to a wired communication network 958. The network interface 957 may include a plurality of connection terminals. The wired communication network 958 may be a LAN such as Ethernet (registered trademark) or a wide area network (WAN).

The wireless communication interface 963 supports one or more of wireless LAN standards such as IEEE 802.11a, 11b, 11g, 11n, 11ac, and 11ad, and provides wireless connection to a neighboring terminal as an access point. The wireless communication interface 963 can typically include a baseband processor, an RF circuit, a power amplifier, and the like. The wireless communication interface 963 may be a single-chip module on which a memory for storing a communication control program, a processor for executing the program, and a relevant circuit are integrated. The antenna switch 964 switches a connection destination of the antenna 965 among a plurality of circuits included in the wireless communication interface 963. The antenna 965 includes a single antenna element or a plurality of antenna elements, and is used for transmission and reception of a wireless signal through the wireless communication interface 963.

In the wireless access point 950 illustrated in FIG. 23, the data processing unit 210, the control unit 220, and the wireless communication unit 230 described with reference to FIG. 3 may be mounted on the wireless communication interface 963. In addition, at least some of these functions may be mounted on the controller 951. For example, the wireless communication unit 230 receives a frame including the tentative AID and the control unit 220 causes the data processing unit 210 to generate the frame with the VHT PPDU format in which the tentative AID included in the received frame is destination information. Then, the generated frame is transmitted by the wireless communication unit 230. Therefore, by using the tentative AID in the communication between the wireless access point 950 and a connected terminal, it is possible to improve efficiency of communication between the wireless access point 950 and the terminal.

5. CONCLUSION

As described above, according to the first embodiment of the present disclosure, by using the tentative AID in the communication between the STA 100 and the AP 200, it is possible to improve communication efficiency in communication before allocation of the AID. For example, by using the tentative AID instead of the MAC address, it is possible to reduce the size of the header without executing the association process. In addition, by omitting the association process, it is possible to reduce an overhead of communication with the AP 200.

In addition, according to the second embodiment of the present disclosure, for example, by using the tentative AID whose notification is issued using the association request frame in a process of demultiplexing the multiplexed frame, it is possible to multiplex the association response frame. Accordingly, communication resources related to the transmission of the association response frame are efficiently used, and thus it is possible to improve efficiency of communication related to the association process.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the foregoing embodiments, the tentative AID has been used in the association process and the sounding process for the channel, but the tentative AID may be used in another process in which the AID or information based on the AID is used. For example, the tentative AID according to each embodiment of the present disclosure is used in a power saving polling process or the like.

In addition, in the foregoing embodiments, the example in which the communication system includes the STAs 100 and the AP 200 has been described, but one of the STAs 100 may be a communication device that has a plurality of direct links with other STAs 100 instead of the AP 200. In this case, a downlink can be said to be "simultaneous transmission from one STA 100 to a plurality of STAs 100" and an uplink can be said to be "simultaneous transmission from a plurality of STAs 100 to one STA 100."

In addition, in the foregoing embodiment, the example in which the VHT NDP Announcement frame is transmitted as the second frame has been described, but the BRP frame may be transmitted as the second frame.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

Additionally, the present technology may also be configured as below.

(1)
A communication device including:
a communication unit configured to transmit a first frame including a second association identifier decided by a communication device to which a first association identifier is allocated and receive a second frame including information related to the second association identifier.

(2)
The communication device according to (1), in which the second association identifier is decided within a setting range of the second association identifier.

(3)
The communication device according to (2), in which the setting range of the second association identifier includes a setting range of the first association identifier or a setting range different from the setting range of the first association identifier.

(4)
The communication device according to any one of (1) to (3), further including:
a control unit configured to decide the second association identifier different from the second association identifier used in another communication device.

(5)
The communication device according to any one of (1) to (4), in which
the information related to the second association identifier includes information indicating the second association identifier or information decided on a basis of the second association identifier.

(6)
The communication device according to any one of (1) to (5), in which
the second frame includes a frame related to a channel information request.

(7)
The communication device according to (6), in which
the frame related to the channel information request includes a frame for issuing a notification of transmission of a channel request frame.

(8)
The communication device according to any one of (1) to (7), in which
the first frame includes a frame including the second association identifier as transmission source information of the frame.

(9)
The communication device according to any one of (1) to (8), in which
the second frame includes a frame including the second association identifier as destination information of the frame.

(10)
The communication device according to any one of (1) to (9), in which
the first frame includes an association request frame, and the second frame includes an association response frame for the association request frame.

(11)
The communication device according to any one of (1) to (10), in which
the communication unit transmits the first frame including the second association identifier different from the second association identifier included in the first frame for which a confirmation response frame has not been received.

(12)
The communication device according to any one of (1) to (11), in which
the second frame is transmitted to a plurality of communication devices at one time.

(13)
The communication device according to (12), in which the second frame is multiplexed.

(14)
A communication device including:
a communication unit configured to receive a first frame including a second association identifier generated by a communication device to which a first association identifier is allocated and transmit a second frame including information related to the second association identifier.

(15)
The communication device according to (14), in which the communication unit transmits a confirmation response frame for the first frame on a basis of whether the second association identifier is usable.

(16)
The communication device according to (15), in which whether the second association identifier is usable is determined on a basis of whether the second association identifier overlaps between communication devices transmitting the first frame.

(17)

A communication method including: by a communication unit,
  transmitting a first frame including a second association identifier decided by a communication device to which a first association identifier is allocated; and
  receiving a second frame including information related to the second association identifier.

(18)

A communication method including: by a communication unit,
  receiving a first frame including a second association identifier generated by a communication device to which a first association identifier is allocated; and
  transmitting a second frame including information related to the second association identifier.

REFERENCE SIGNS LIST

100 STA
110, 210 data processing unit
120, 220 control unit
130, 230 wireless communication unit
200 AP

The invention claimed is:

1. A communication control device comprising:
  control circuitry configured to control wireless communication circuitry included in a wireless communication device:
    to transmit a first frame including an association identifier that the wireless communication device uses in a wireless communication network, and
    to receive a second frame in response to the first frame;
  wherein the association identifier is shorter in data length than a Media Access Control (MAC) address,
  wherein the association identifier is taken from a set of values different from a set of values in the range of 0x0001 to 0x07D7, and
  wherein the control circuitry is further configured to control the wireless communication circuitry to transmit the first frame, in both a first case in which the wireless communication device is associated with another wireless communication device, and a second case in which the wireless communication device is not associated with the another wireless communication device.

2. The communication control device according to claim 1, wherein the second frame includes information decided on a basis of the association identifier.

3. The communication control device according to claim 1, wherein the second frame includes information indicating the association identifier.

4. The communication control device according to claim 1, wherein the first frame is a frame including the association identifier as transmission source information of the frame.

5. The communication control device according to claim 1, wherein the second frame is a frame including the association identifier as destination information of the frame.

6. The communication control device according to claim 1, wherein the second frame is transmitted to a plurality of wireless communication devices at one time.

7. The communication control device according to claim 6, wherein the second frame is multiplexed.

8. The communication control device according to claim 1, wherein the another wireless communication device is associated with a first association identifier, which is taken from a set of values in the range of 0x0001 to 0x07D7.

9. The communication control device according to claim 8, wherein the second frame includes information associated with the first association identifier.

10. A base station comprising the communication control device of claim 1.

11. A communication control device comprising:
  control circuitry configured to control wireless communication circuitry included in a wireless communication device:
    to receive a first frame including an association identifier from another wireless communication device, and
    to transmit a second frame including information related to the association identifier in response to the first frame;
  wherein the association identifier is shorter in data length than a Media Access Control (MAC) address,
  wherein the association identifier is taken from a set of values different from a set of values in the range of 0x0001 to 0x07D7, and
  wherein the control circuitry is further configured to control the wireless communication circuitry to transmit the second frame, in both a first case in which the wireless communication device is associated with the another wireless communication device, and a second case in which the wireless communication device is not associated with the another wireless communication device.

12. The communication control device according to claim 11, wherein the second frame includes information decided on a basis of the association identifier.

13. The communication control device according to claim 11, wherein the second frame includes information indicating the association identifier.

14. The communication control device according to claim 11, wherein the another wireless communication device is associated with a first association identifier, which is taken from a set of values in the range of 0x0001 to 0x07D7.

15. The communication control device according to claim 14, wherein the second frame includes information associated with the first association identifier.

16. A base station comprising the communication control device of claim 11.

17. A communication control method executed in control circuitry, the communication control method comprising:
  controlling wireless communication circuitry which is included in a wireless communication device to transmit a first frame including an association identifier that the wireless communication device uses in a communication network; and
  controlling the wireless communication circuitry to receive a second frame in response to the first frame;
  wherein the association identifier is shorter in data length than a Media Access Control (MAC) address;
  wherein the association identifier is taken from a set of values different from a set of values in the range of 0x0001 to 0x07D7, and
  wherein the control circuitry is further configured to control the wireless communication circuitry to transmit the first frame, in both a first case in which the communication device is associated with another wireless communication device, and a second case in which the wireless communication device is not associated with the another wireless communication device.

18. A communication control method executed in control circuitry, the communication control method comprising:

controlling wireless communication circuitry which is included in a wireless communication device to receive a first frame including an association identifier from another communication device; and controlling the wireless communication circuitry to transmit a second frame in response to the first frame;

wherein the association identifier is shorter in data length than a Media Access Control (MAC) address;

wherein the association identifier is taken from a set of values different from a set of values in the range of 0x0001 to 0x07D7, wherein the control circuitry is further configured to control the wireless communication circuitry to transmit the second frame, in both a first case in which the wireless communication device is associated with the another wireless communication device, and a second case in which the wireless communication device is not associated with the another wireless communication device.

\* \* \* \* \*